United States Patent
Chandrasekhar et al.

(10) Patent No.: US 11,516,051 B2
(45) Date of Patent: Nov. 29, 2022

(54) METHOD AND APPARATUS FOR AI-BASED UE SPEED ESTIMATION USING UPLINK SRS MEASUREMENTS

(71) Applicant: Samsung Electronics Co., Ltd., Suwon-si (KR)

(72) Inventors: Vikram Chandrasekhar, Mountain View, CA (US); Jianzhong Zhang, Plano, TX (US); Saidhiraj Amuru, Hyderabad (IN); Yeqing Hu, Garland, TX (US); Hao Chen, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 16/270,486

(22) Filed: Feb. 7, 2019

(65) Prior Publication Data

US 2019/0277957 A1  Sep. 12, 2019

Related U.S. Application Data

(60) Provisional application No. 62/716,682, filed on Aug. 9, 2018, provisional application No. 62/639,131, filed on Mar. 6, 2018.

(51) Int. Cl.
*H04L 25/02* (2006.01)
*G06N 3/08* (2006.01)
(Continued)

(52) U.S. Cl.
CPC .......... *H04L 25/0224* (2013.01); *G06N 3/04* (2013.01); *G06N 3/08* (2013.01); *G06N 20/00* (2019.01)

(58) Field of Classification Search
CPC .................................................. H04W 64/006
See application file for complete search history.

(56) References Cited

U.S. PATENT DOCUMENTS 5,717,406 A  2/1998  Sanderford et al.
5,917,449 A  6/1999  Sanderford et al.
(Continued)

FOREIGN PATENT DOCUMENTS

CN  1619983 A  5/2005
CN  103188058 A  7/2013
(Continued)

OTHER PUBLICATIONS

European Patent Office, Supplementary European Search Report in connection with European Patent Application No. 19764995.7 dated Feb. 1, 2021, 20 pages.
(Continued)

*Primary Examiner* — Kevin Kim

(57) ABSTRACT

An apparatus for performing a wireless communication includes a communication interface configured to measure uplink (UL) Sounding Reference Signals (SRSs) transmitted from a mobile client device, and at least one processor configured to buffer a number of uplink (UL) SRS measurements derived from UL SRS transmissions of the mobile client device, the number of UL SRS measurements exceeding a threshold, extract features from UL SRS measurements, obtain a machine learning (ML) classifier for determining a category to be used for estimating mobility associated with the mobile client device, and determine the category of the mobile client device by applying the extracted features to the ML classifier. Methods and apparatus extract the features of either a set of power spectrum density measurements or a set of pre-processed frequency domain real and imaginary portions of UL SRS measurements and feed the features to an AI classifier for UE speed estimation.

20 Claims, 16 Drawing Sheets

(51) Int. Cl.
  *G06N 20/00* (2019.01)
  *G06N 3/04* (2006.01)

(56) References Cited

U.S. PATENT DOCUMENTS

| | | | |
|---|---|---|---|
| 6,480,716 | B2 | 11/2002 | Salonaho |
| 9,673,922 | B2 | 6/2017 | Haddad et al. |
| 2004/0097197 | A1 | 5/2004 | Juncker et al. |
| 2005/0060094 | A1 | 3/2005 | Lee et al. |
| 2010/0216406 | A1 | 8/2010 | Park et al. |
| 2012/0027140 | A1 | 2/2012 | Weng et al. |
| 2013/0163645 | A1 | 6/2013 | Kuo et al. |
| 2014/0050257 | A1 | 2/2014 | Beauregard |
| 2014/0098691 | A1* | 4/2014 | Kazmi .................. H04W 24/08 370/252 |
| 2016/0080095 | A1 | 3/2016 | Haddad et al. |
| 2016/0227458 | A1* | 8/2016 | Lee ....................... H04W 48/04 |
| 2016/0353340 | A1* | 12/2016 | Yang ................. H04W 36/0058 |
| 2017/0094566 | A1* | 3/2017 | Yang ................. H04W 36/0085 |
| 2018/0206075 | A1 | 7/2018 | Demirdag et al. |

FOREIGN PATENT DOCUMENTS

| | | |
|---|---|---|
| CN | 105165080 A | 12/2015 |
| WO | 2015004267 A1 | 1/2015 |
| WO | WO-2018072842 A1 * | 4/2018 ........ H04W 56/0035 |

OTHER PUBLICATIONS

Bustince, et al., "Directional monotonicity of fusion functions," European Journal of Operational Research, Decision Support, Jan. 10, 2015, 9 pages.

Supplementary Partial European Search Report in connection with European Application No. 19764995.7 dated Sep. 28, 2020, 15 pages.

Tse et al., "Fundamentals of Wireless Communication", Cambridge University Press, 2005, 587 pages.

Wang, "Doppler Spread Estimation in High Mobility Wireless Communications", Thesis, Master of Engineering by Research, University of Wollongong, School of Electrical, Computer and Telecommunications Engineering, Mar. 2015, 101 pages.

Braun et al., "Maximum Likelihood Speed and Distance Estimation for OFDM Radar", 2010 IEEE Radar Conference, May 2010, 6 pages.

Krasny et al., "Doppler spread estimation in mobile radio systems", IEEE Communications Letters, vol. 5, No. 5, May 2001, pp. 197-199.

Zhang et al., "Mobile Speed Estimation Using Diversity Combining in Fading Channels", IEEE Global Telecommunications Conference (GLOBECOM '04), Nov. 2004, 5 pages.

Austin et al., "Velocity adaptive handoff algorithms for microcellular systems", IEEE Transactions on Vehicular Technology, vol. 43, No. 3, Aug. 1994, pp. 549-561.

Holtzman et al., "Adaptive averaging methodology for handoffs in cellular systems", IEEE Transactions on Vehicular Technology, vol. 44, No. 1, Feb. 1995, pp. 59-66.

Zheng et al., "Mobile Speed Estimation for Broadband Wireless Communications over Rician Fading Channels", IEEE Transactions on Wireless Communications, vol. 8, No. 1, Jan. 2009, pp. 1-5.

Miyamoto et al., "Proposal of Doppler Estimation Method of Using Frequency Channel Response for OFDM Systems", 7th International Conference on Signal Processing and Communication Systems (ICSPCS), Dec. 2013, 9 pages.

Xiao et al., "Mobile Speed Estimation for TDMA-Based Hierarchical Cellular Systems", IEEE Transactions on Vehicular Technology, vol. 50, No. 4, Jul. 2001, pp. 981-991.

Haddad et al., "Mobility State Estimation in LTE", 2016 IEEE Wireless Communications and Networking Conference, 2016 IEEE Wireless Communications and Networking Conference, Apr. 2016, 6 pages.

"3rd Generation Partnership Project; Technical Specification Group Radio Access Network; Study on channel model for frequencies from 0.5 to 100 GHz (Release 15)", Technical Report 3GPP TR 38.901, V15.0.0, Jun. 2018, 91 pages.

ISA/KR, "International Search Report and Written Opinion of the International Searching Authority," International Application No. PCT/KR2019/002586, dated Jun. 7, 2019, 10 pages.

Gopalakrishnan, Kasthurirangan, et al., "Deep Convolutional Neural Networks with transfer learning for computer vision-based data-driven pavement distress detection," Construction and Building Materials, vol. 157, Dec. 2017, 10 pages.

China National Intellectual Property Administration, "First Office Action" dated Nov. 18, 2021, in connection with corresponding Chinese Patent Application No. 201980016775.9, 13 pages.

* cited by examiner

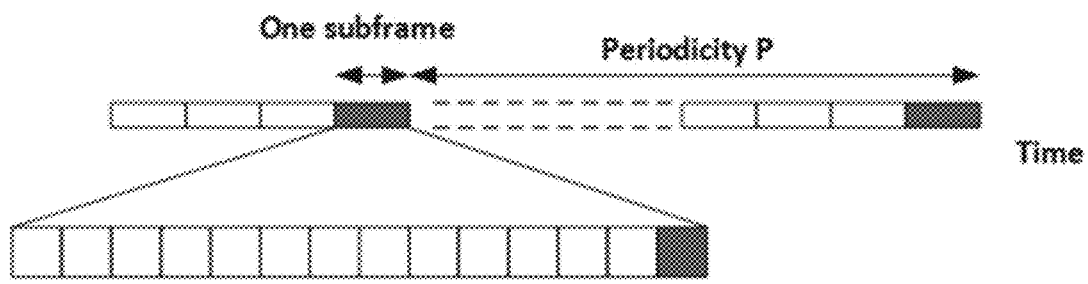
FIG. 6A
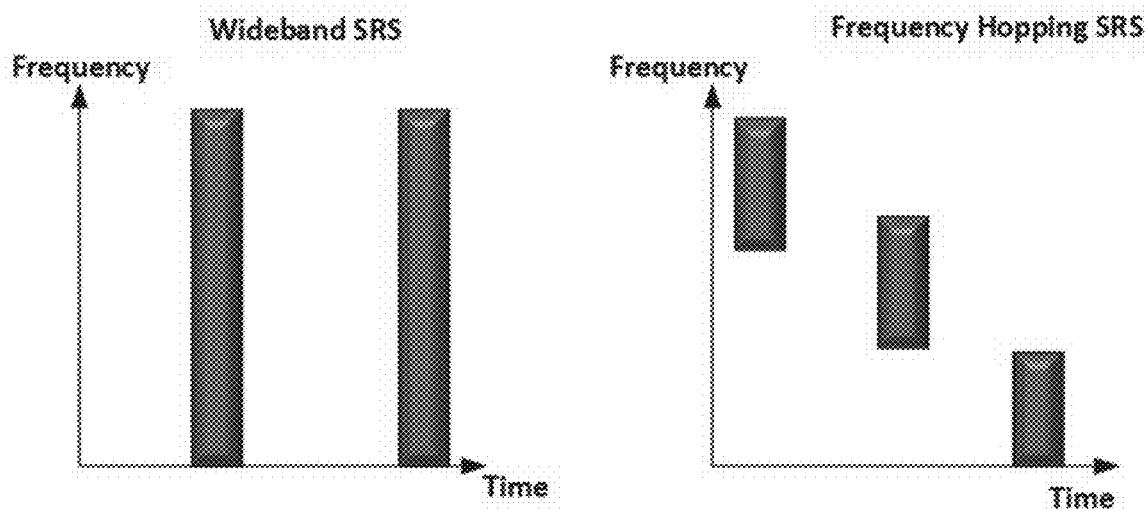
FIG. 6B
FIG. 6C

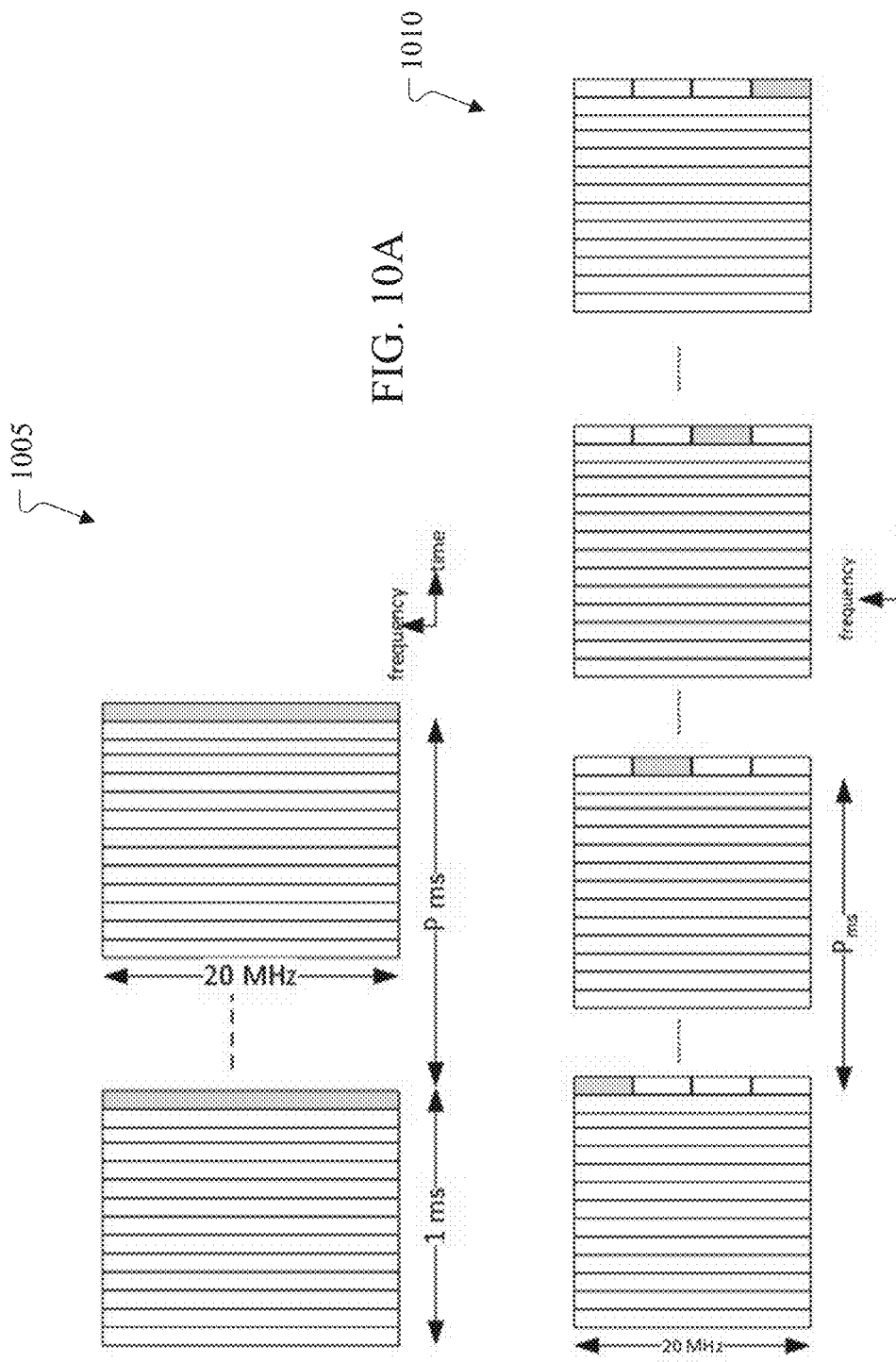

METHOD AND APPARATUS FOR AI-BASED UE SPEED ESTIMATION USING UPLINK SRS MEASUREMENTS

CROSS-REFERENCE TO RELATED APPLICATION AND CLAIM OF PRIORITY

This application claims priority under 35 U.S.C. § 119(e) to U.S. Provisional Patent Application No. 62/639,131 filed on Mar. 6, 2018; and U.S. Provisional Patent Application No. 62/716,682 filed on Aug. 9, 2018. The above-identified provisional patent applications are hereby incorporated by reference in their entirety.

TECHNICAL FIELD

This disclosure relates generally to methods and apparatus for an Artificial Intelligence (AI) assisted UE speed estimation based on uplink SRS channel measurement inputs. In particular, methods and apparatus extract the features of either a set of power spectrum density measurements or a set of pre-processed frequency domain real and imaginary portions of UL SRS measurements and feed the features to an AI classifier for UE speed estimation.

BACKGROUND

Knowledge of either the terminal speed or the category in which the terminal speed falls is vital for optimizing various radio resource management functions such as handover, mobility load balancing, and transmission scheduling at the network. A simple example could be that for transmission scheduling, the network may use frequency diverse scheduling to high speed users in order to maximize robustness of reception. For low speed users on the other hand, it may be preferable for the network to provide localized frequency scheduling so as to maximize the system spectral efficiency. As part of mobility robustness optimization, the network could adapt its handover parameters differently based on the mobility of the terminal. For mmWave systems, estimating terminal speed is potentially useful for beam prediction (and channel prediction techniques) considering the correlation in channel properties across the various beams used by the terminals. This can significantly reduce the beam scanning and beam sweeping time typically involved in mmWave systems.

SUMMARY

This disclosure provides an Artificial Intelligence assisted approach to categorize or determine the speed of a UE based on uplink SRS channel measurement inputs.

In a first embodiment, an apparatus for performing a wireless communication is provided. The apparatus includes a communication interface configured to measure uplink (UL) Sounding Reference Signals (SRSs) transmitted from a mobile client device, and a processor configured to buffer a number of uplink (UL) SRS measurements derived from UL SRS transmissions of the mobile client device, the number exceeding a threshold, extract features from UL SRS measurements, obtain a machine learning (ML) classifier for determining a category to be used for estimating mobility associated with the mobile client device, and determine the category of the mobile client device by applying the extracted features to the ML classifier.

In a second embodiment, a method for estimating a speed of a mobile client device includes measuring uplink (UL) Sounding Reference Signals (SRSs) transmitted from a mobile client device, buffering a number of uplink (UL) SRS measurements derived from UL SRS transmissions of the mobile client device, the number exceeding a threshold, extracting features from UL SRS measurements, obtaining a machine learning (ML) classifier for determining a category to be used for estimating mobility associated with the mobile client device, and determining the category of the mobile client device by applying the extracted features to the ML classifier.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 6A to 6C illustrate uplink (UL) SRS transmissions according to embodiments of the present disclosure;

FIG. 10A illustrates an example of wideband SRS transmissions, and FIG. 10B illustrates an example of frequency hopped SRS (FH SRS) transmissions, according to embodiments of the present disclosure;

DETAILED DESCRIPTION

FIGS. 1 through 13C, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
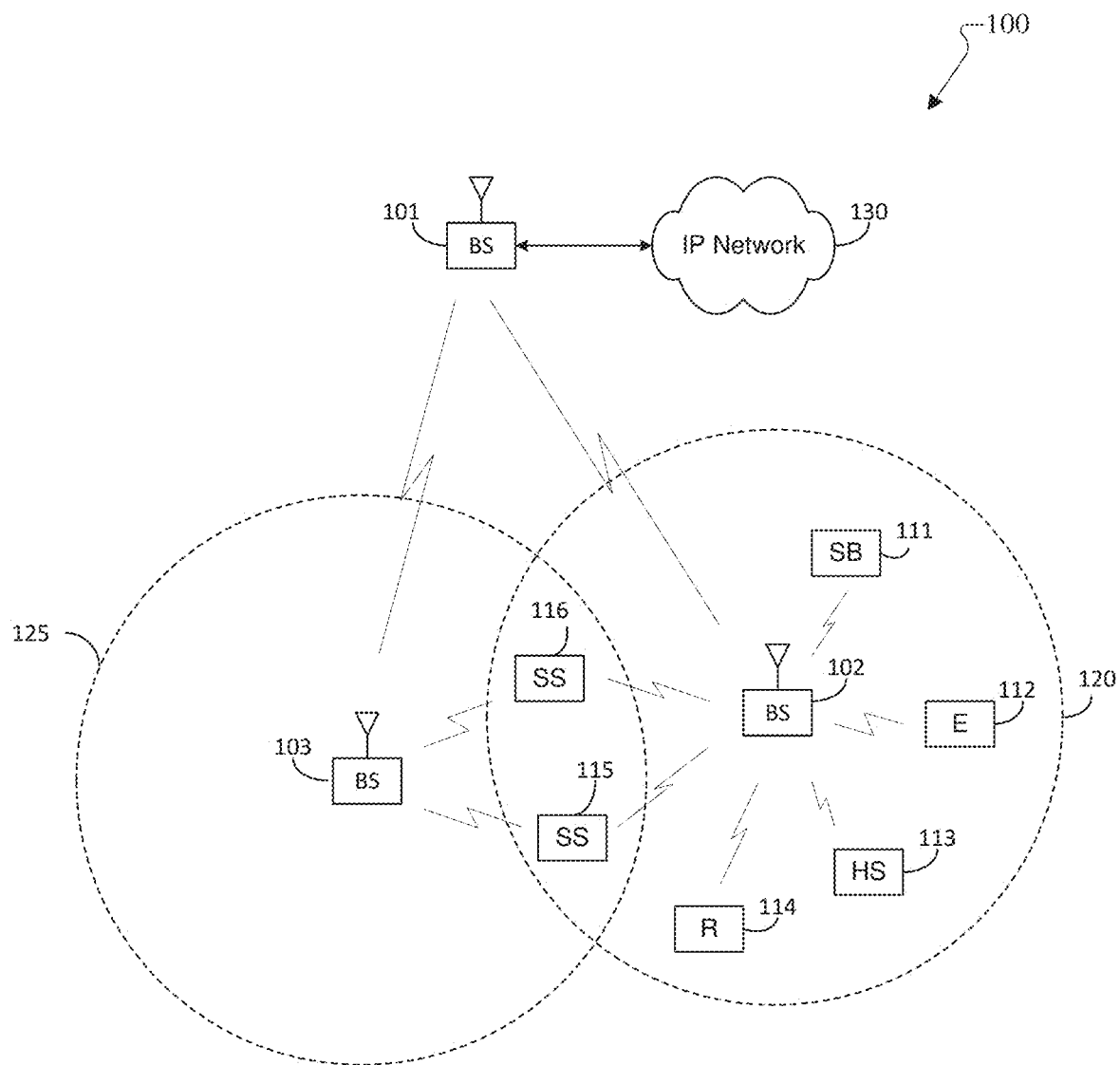
FIG. 1 illustrates an example computing system according to various embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Some embodiments of the present disclosure are described assuming cellular DL communications. However, the same/similar principles and related signaling methods & configurations can also be used for cellular UL & sidelink (SL)

Mobile speed classification methods described herein rely on obtaining the speed class through estimating the Doppler spread of the underlying mobile radio channel.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
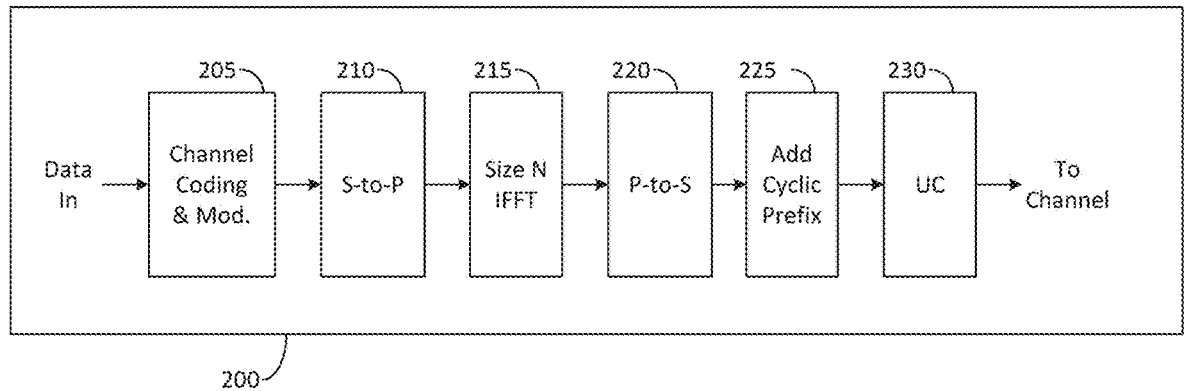
FIGS. 2A-2B and 3A-3B illustrate example devices in a computing system according to various embodiments of the present disclosure.
Figure 2B:
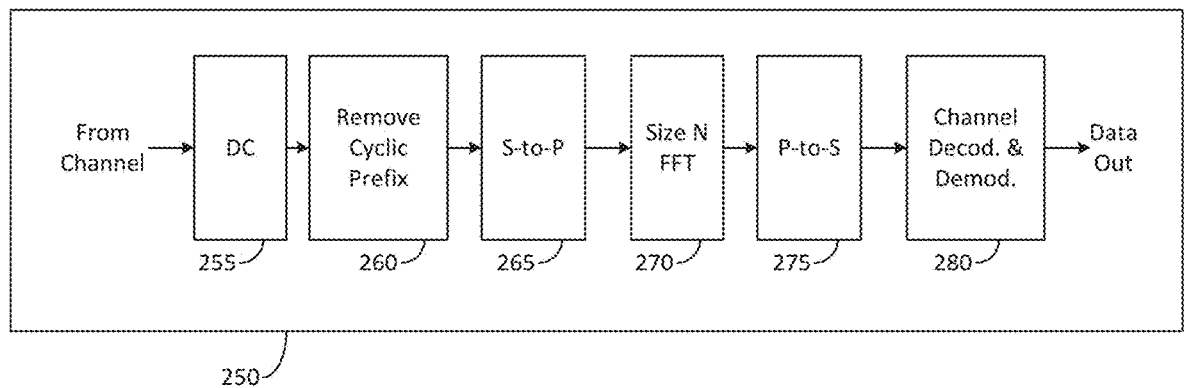

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
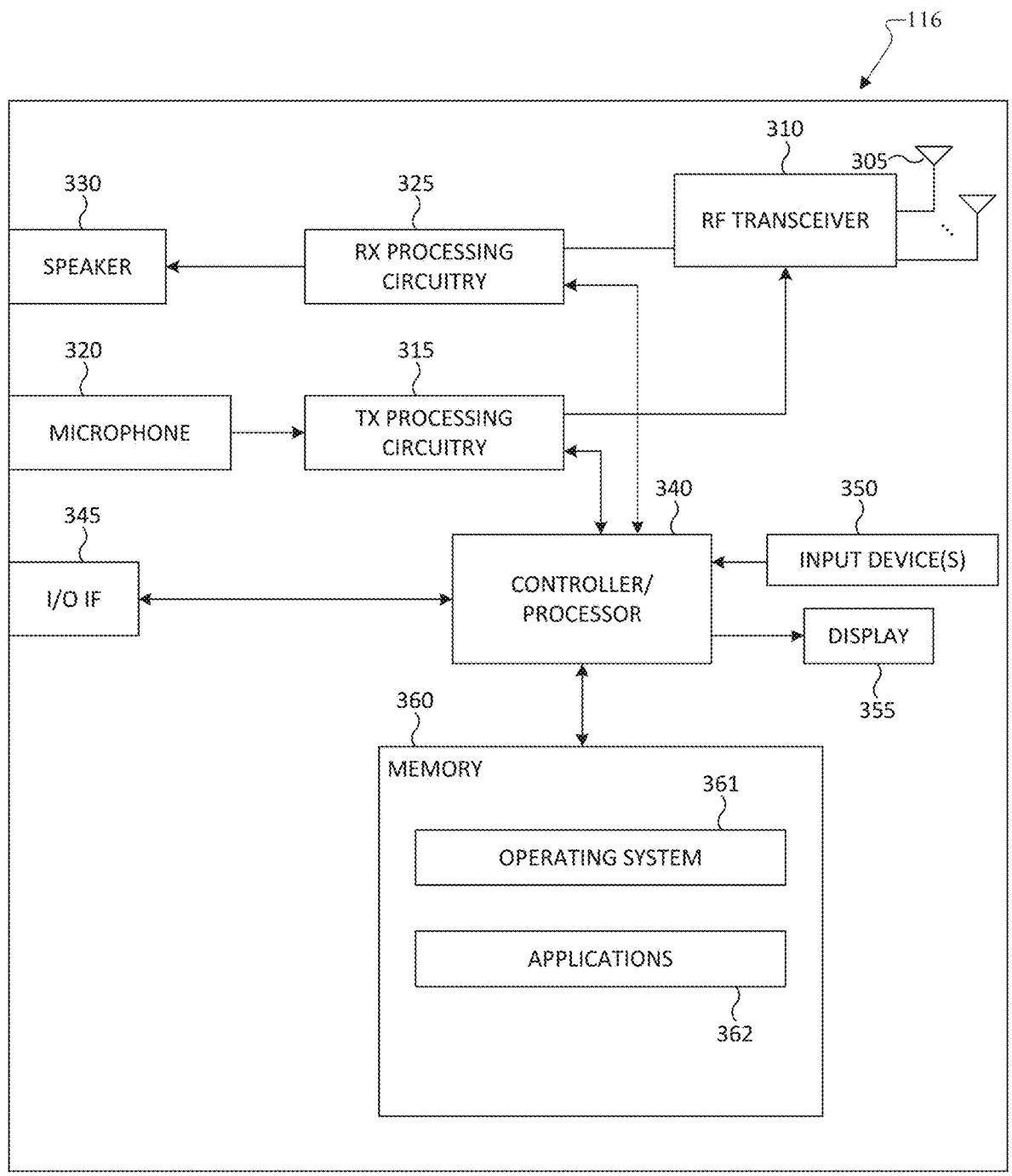

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
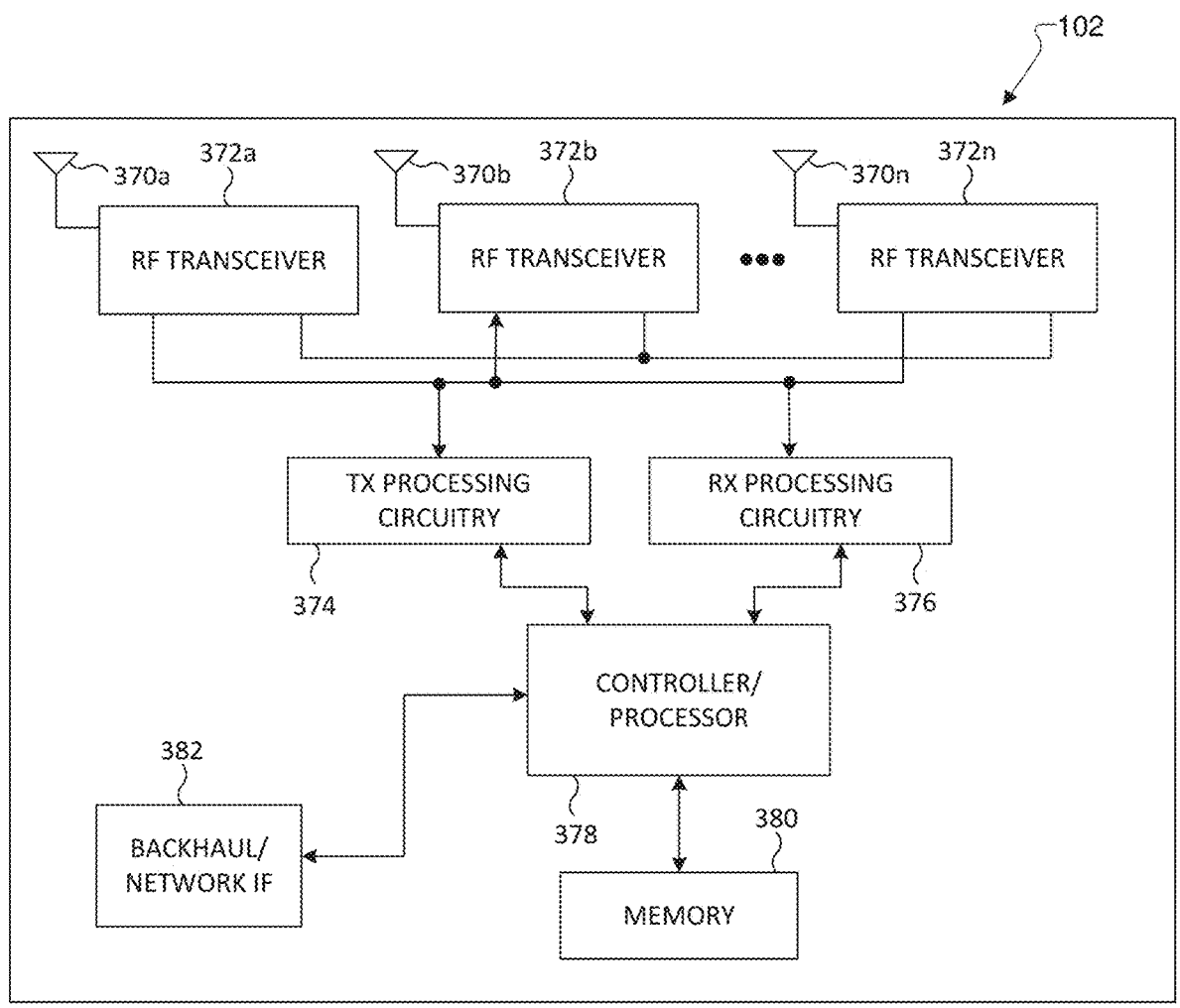

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process. The memory 380 stores various artificial intelligence (AI) algorithms for estimating a UE speed and a training dataset to train the various AI algorithms.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
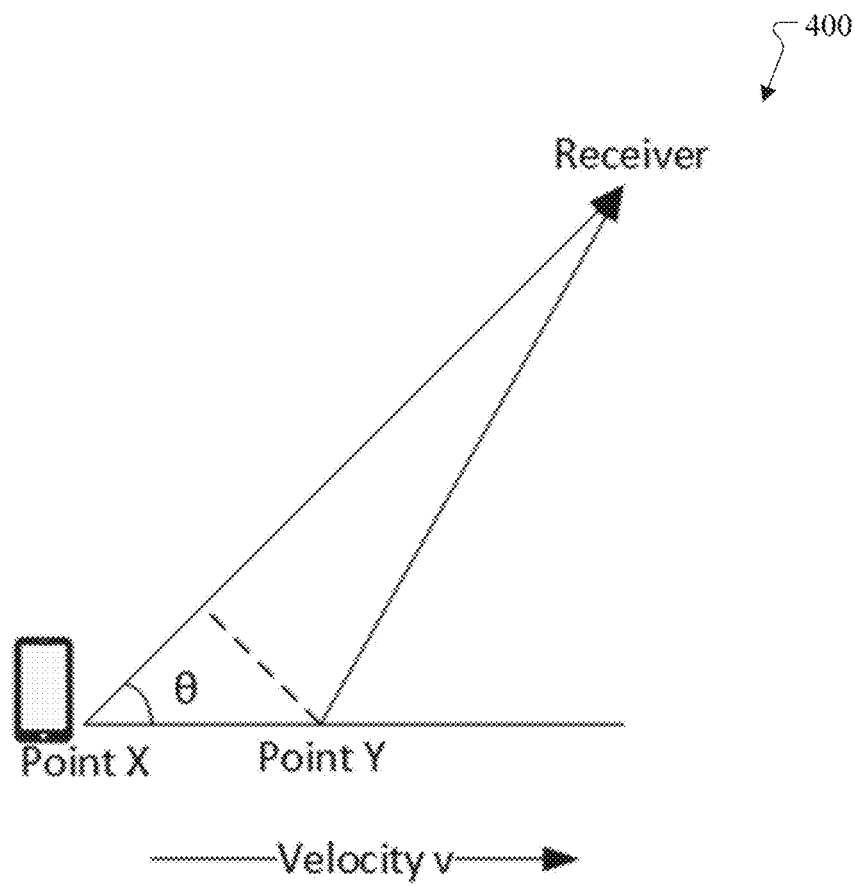
FIG. 4 illustrates an exemplary diagram 400 for explaining Doppler Shift in a mobile radio channel according to one embodiment of the present disclosure.

FIG. 4 illustrates an exemplary diagram 400 for explaining Doppler Shift in a mobile radio channel according to one embodiment of the present disclosure.

The physical movement of a wireless transmitting (resp. receiving) device relative to the receiver (resp. transmitter) creates the well-known Doppler effect. The Doppler effect manifests itself in a frequency shift, termed Doppler Shift, of the transmitted signal as experienced at the receiver. The Doppler shift f is given by the following expression:

$$f = f_d \cos \theta, f_d := \frac{v f_c}{c}. \tag{1}$$

In the above expression, $f_d$ is the maximum Doppler frequency, v denotes the speed of the moving terminal, $f_c$ designates the carrier frequency and θ denotes the angle made by the rays relative to a (reference) coordinate system (often denoting the angle between the path direction and the user moving direction). Because of multi-paths, each multipath wave arrives at the receiver from different directions, thus different propagation paths result in different Doppler shifts. Thus, estimating the Doppler shift of a given path (e.g. dominant path) does not explicitly provide the terminal speed information). Considering the azimuthal and elevation direction, the Doppler shift as described above can be generalized via the following expression where v is the velocity vector and $\hat{r}_{rx,n,m}^T$ designates the spherical unit vector with azimuth departure angle $\phi_{n,m,ZOD}$ and elevation departure angle $\theta_{n,m,ZOD}$. It is evident that different velocity vectors can result in identical Doppler shift (depending on the propagation paths and angles made by the velocity vector with the ray propagation direction).

$$f_{d,n,m} = \frac{\hat{r}_{rx,n,m}^T \cdot \overline{v}}{\lambda_0}, \overline{v} = v \cdot [\sin \theta_v \cos \phi_v \quad \sin \theta_v \sin \phi_v \quad \cos \theta_v]^T \tag{2}$$

$$\hat{r}_{rx,n,m}^T = [\sin \theta_{n,m,ZOD} \cos \phi_{n,m,ZOD} \quad \sin \theta_{n,m,ZOD} \sin \phi_{n,m,ZOD} \quad \cos \theta_{n,m,ZOD}]$$

The aggregation of the received signal from a multitude of propagation paths results in a spectral broadening of the received signal, also known as the Doppler Spread, relative to that sent by the transmitter. The Doppler spread is thus a measure of the increase in bandwidth at the received signal relative to the transmitted signal, caused as a result of the time rate of change of the underlying radio channel.

Existing speed classification works can be roughly classified into the following four categories. 1) Maximum Likelihood methods that rely on periodic channel estimation to infer one or more properties of the channel. 2) Level Crossing Rate based methods that count the number of times that a process crosses a certain level. 3) Covariance based methods that estimate the second-order statistics of the received signal power. 4) Autocorrelation based methods that estimates the autocorrelation of the estimated channel impulse response (CIR) and infer the Doppler spread/UE speed by looking at the power spectral density.

Level crossing rate and covariance methods suffer from increased sensitivity with reduced SNR and suffer from higher error when the UE speed is small. Furthermore, threshold based techniques may work in a certain environment when a threshold is fine-tuned, but the same threshold may fail to work in other settings. Maximum likelihood-based methods typically have high computational complexity and require apriori knowledge of the system SNR/noise variance.

The present disclosure provides a new method relying on an AI based speed classifier. The AI system includes a neural network which processes uplink signal measurements made on an LTE signal such as the Sounding Reference Signal (SRS) and determines the most likely speed class for that user from among $N_{classes}$ number of speed classes.

Figure 5:
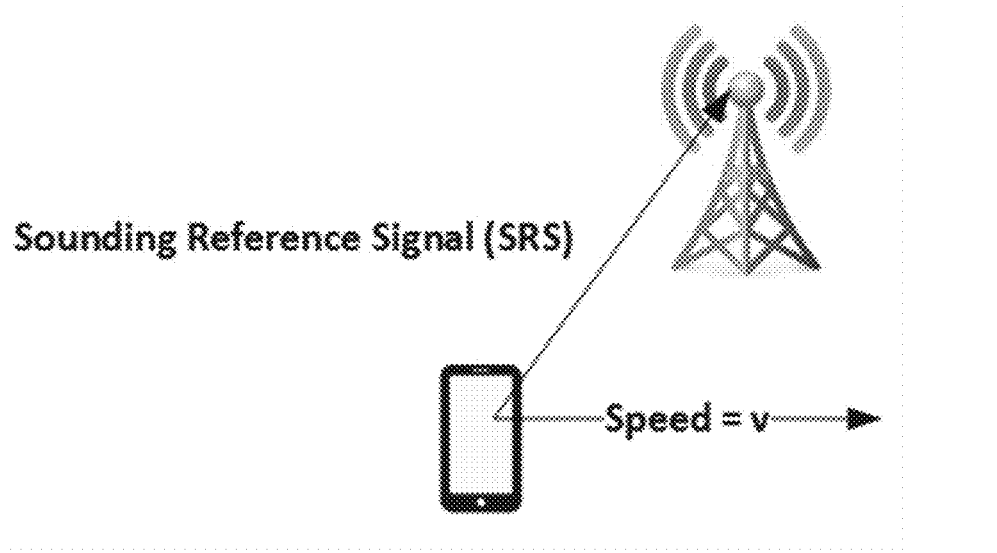
FIG. 5 illustrates a diagram of a LTE SRS signal transmitted from a moving terminal according to one embodiment of the present disclosure.

FIG. 5 illustrates a diagram 500 of a LTE SRS signal transmitted from a moving terminal according to one embodiment of the present disclosure.

The SRS signal is used to determine the uplink channel quality using which the eNB can decide what uplink resource blocks and modulation and coding scheme should be employed while scheduling that UE. The neural classifier could also reside at the terminal by making use of downlink reference signal measurements (e.g., based on Cell Specific Reference Signal (CRS)/channel state information reference symbol (CSI-RS)) wherein the said application can find use in device to device (D2D) systems as well. As seen in performance evaluations under 3GPP channel model, the scheme is able to classify a UE speed with a high degree of accuracy even when the direction of the terminal's motion and the angle of different propagation paths are randomly chosen. The output of the neural network can either be an absolute estimated UE speed or an estimated category in which the UE speed belongs. In another embodiment, the CQI (or MCS) reports may also be used as inputs to the classifier in order to identify the UE speed along similar lines as mentioned in this disclosure.

The scheme described in the present disclosure provides an Artificial Intelligence (AI) assisted speed classification scheme. The AI classifier is a neural network based classifier. Two different AI classifier architectures have been evaluated. The first architecture is a fully connected neural network, while the second architecture is a convolutional neural network. The disclosure also provides a supervised learning method to train the neural network. The disclosure describes serval input features that are derived from the uplink SRS channel measurements, using which the neural network determines the speed class for that terminal.

Unlike previous works, the benefits of the embodiments in the present disclosure include the ability to simultaneously determine speed categories for multiple users, zero reliance on prior knowledge of system parameters (e.g. noise variance, Signal-to-Noise ratio, etc.) a low sensitivity to the level of noise, a reasonable computational complexity, and applicability for both wide-band and frequency hopping SRS measurements. While the approach described in the present disclosure assumes that the channel measurements are derived from the SRS measurements, the approach can be extended to estimating a terminal speed based on downlink reference signal measurements as well.

FIGS. 6A to 6C illustrate uplink (UL) SRS transmissions according to embodiments of the present disclosure. The embodiment shown in FIGS. 6A to 6C are for illustration only. Other embodiments could be used without departing from the scope of this disclosure.

The SRS is sent on the last symbol of an uplink subframe. The SRS transmission can occur either in a periodic manner or be triggered aperiodically via a Downlink DCI. In case of periodic SRS, the transmission occurs once every P ms, where P ∈ {2,5,10,20,40,80,160, 320} ms is the network configured SRS transmission periodicity as illustrated in FIG. 6A. Different UE are multiplexed to transmit SRS on the same subframe by transmitting using different cyclic shift and frequency comb. At the eNB receiver, the users are separated after taking into account the unique combination of the cyclic shift and comb associated for each user. For coverage limited UE, to ensure that their transmission power density provides reasonable SNR at the receiver, the SRS transmission is constrained over a portion of the entire (or wideband) uplink bandwidth as illustrated in FIG. 6B. In another embodiment, a UE can be configured to transmit SRS via frequency hopping so that by combining the sounding positions across different hops, the eNB receiver can obtain the channel across the entire bandwidth, as illustrated in FIG. 6C.

Figure 7:
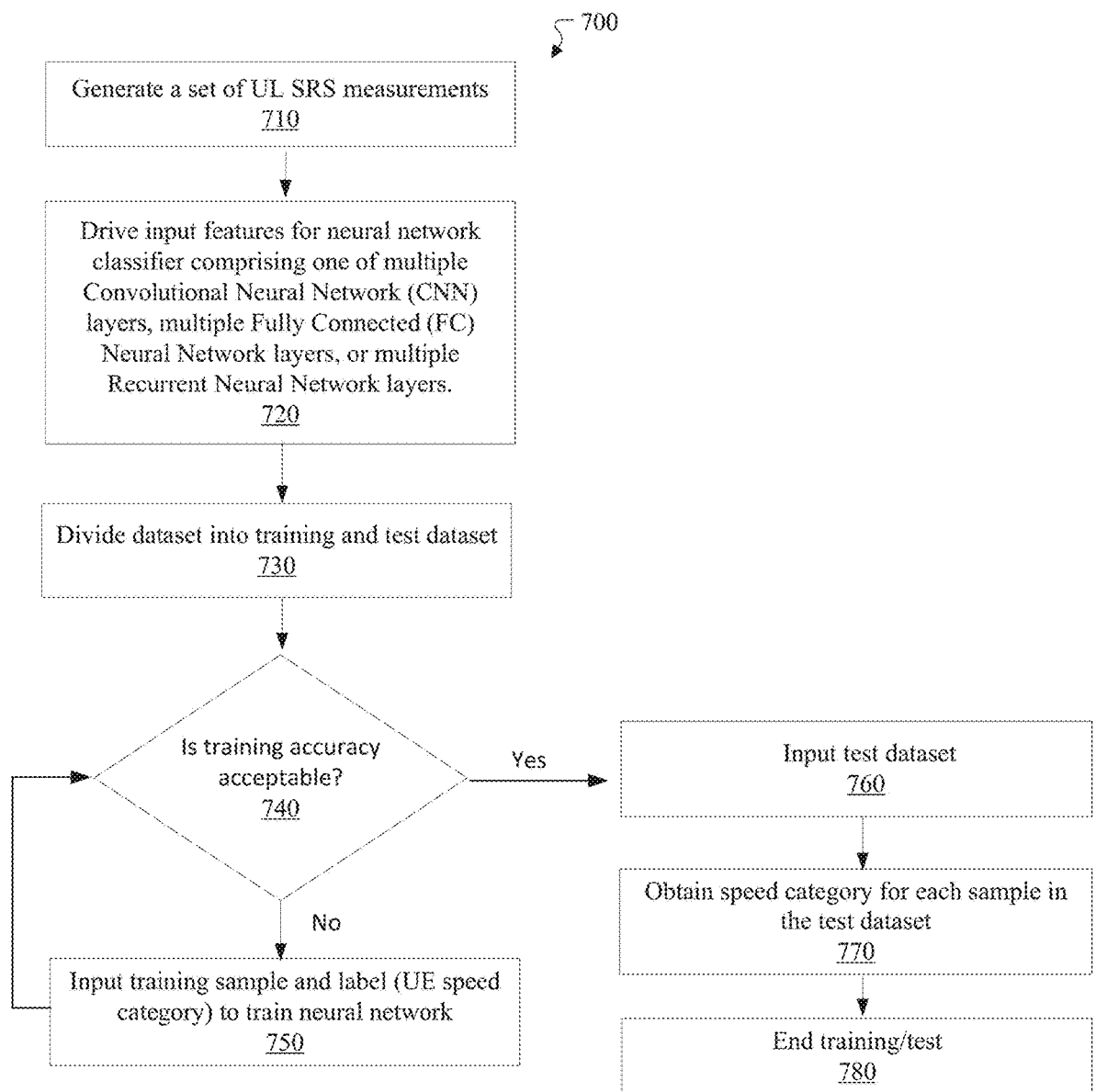
FIG. 7 illustrates a flowchart for training an AI based UE speed classifier for estimating a speed class for a UE according to one embodiment.

FIG. 7 illustrates a flowchart 700 for training an AI based UE speed classifier for estimating a speed class (among M>1 speed classes) for one or more UE according to one embodiment. The embodiment of the flowchart 700 shown in FIG. 7 is for illustration only. Other embodiments of the flowchart 700 could be used without departing from the scope of this disclosure.

In step 710, the AI system equipped with an AI based UE speed classifier generates a set of UL SRS measurements. The AI system generates the labeled data i.e., collection of speed classes and associated features for training the neural network classifier. In one embodiment, the UE speed class for training the neural network could be obtained by simultaneously collecting uplink SRS measurements and (time-stamped) positions of the terminal and measuring the absolute rate of change of the terminal position. A high rate of change of terminal position indicates that the label for that UE moves at "a high speed" while low rate of change indicates the label belongs to "a low-speed". Possibly the terminal could obtain its time-stamped location and communicate to the network e.g. via the application layer. In an alternative embodiment, through a drive test, the network can set up various terminals moving at different (known) speeds and collect uplink SRS measurements associated with the uplink SRS transmissions at each speed.

In step 720, the input features to the AI classifier are derived from the SRS measurements spaced P ms apart where P is the spacing between consecutive SRS transmissions.

In step 730, The dataset comprising the input features are divided into a training dataset for a training phase and a test dataset for a test phase.

In step 740, the flowchart is divided into a training stage (steps 740 and 750) and a test stage (steps 760 and 770). The training phase (steps 740 and 750) is used to adapt the weights of the classifier by feeding the neural network with labeled data. Through the training phase, the AI classifier learns to discriminate different speed category by identifying the aspect of the input feature best suited for each category. The training phase includes $N_{train}$ labeled data $\{(x_i, y_i), 0<=i<=N_{train}-1\}$, where $x_i$ designates the input feature (e.g. a set of uplink channel measurements (or a function of channel measurement) spaced Pms apart) and $y_i$ denotes the label (i.e. UE speed class) tagged to that measurement. Note that the training can be performed offline so that once the neural network is trained, it is ready to classify speeds belonging to unlabeled data.

In step 760, the AI classifier is fed in with features corresponding to unlabeled data and the output of the AI classifier is used to tag the speed class for the unlabeled data.

In step 770, the AI classifier estimates the speed class (among M>1 speed classes) for one or more UE based on uplink signal measurements associated with each UE.

In step 780, the AI classifier ends the training or test.

The classifier accuracy refers to the percentage of the unlabeled data for which the neural network correctly assigns the speed category.

Various types of the input features can be extracted from UL SRS measurements for the AI classifier. In a first embodiment, the input feature for the AI classifier equals the power spectral density derived from the Fast Fourier Transform of the tap gain auto-correlation function associated with the estimated Channel Impulse Response (CIR). In a second different embodiment, the input feature equals the raw frequency domain/time domain uplink SRS channel coefficients.

Power Spectral Density Feature Extraction

Figure 8:
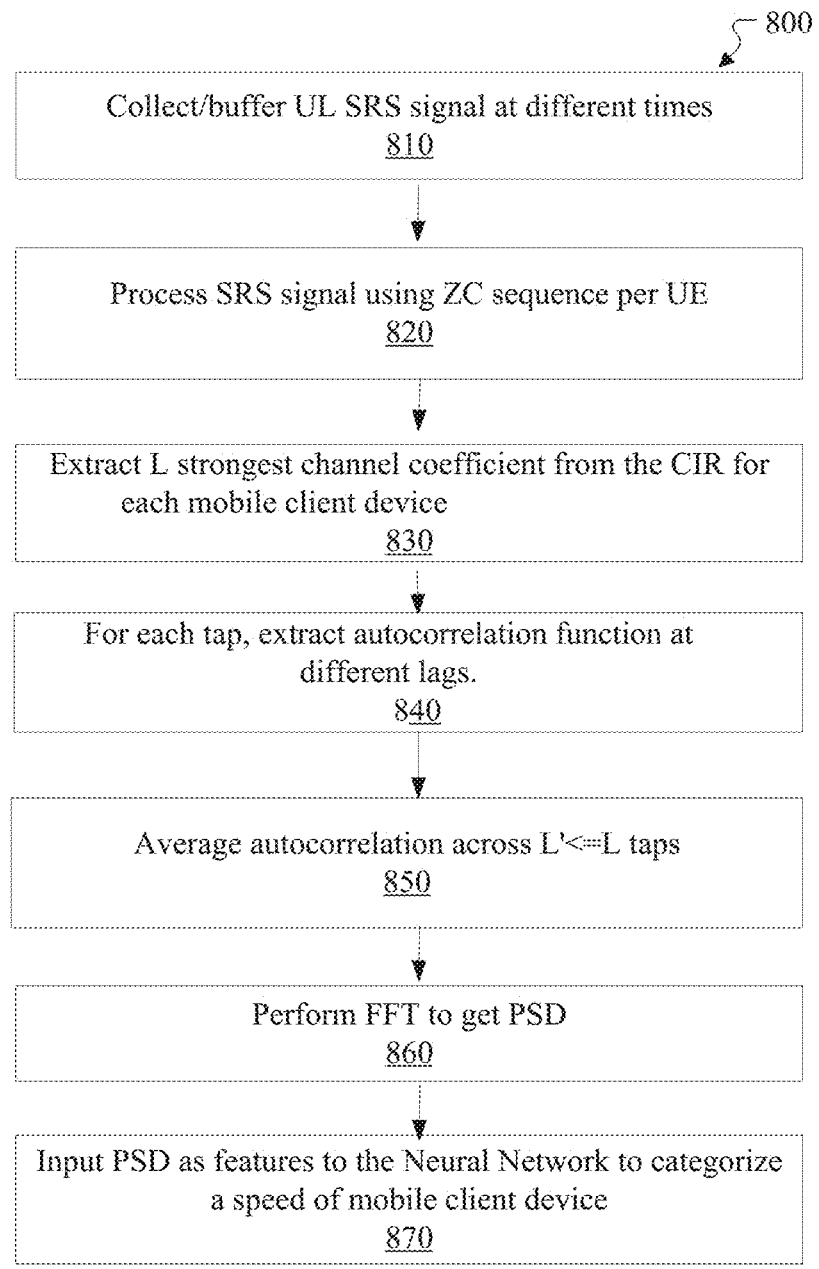
FIG. 8 illustrates a flowchart for estimating a speed class from power spectral density measurements according to one embodiment of the present disclosure.

FIG. 8 illustrates a flowchart 800 for estimating a speed class from power spectral density measurements according to one embodiment of the present disclosure. The embodiment is for illustration only. Other embodiments could be used without departing from the scope of this disclosure.

The flowchart 800 for extracting the PSD which is used to provide the input feature for the AI classifier is shown in FIG. 8. While the flowchart 800 shows the procedure for a single user, the same procedure can be straight-forwardly extended when multiple UEs are multiplexed to simultaneously sound in the same region of bandwidth. The following paragraphs describe the mathematical procedure to extract the autocorrelation function and the power spectral density from the SRS channel estimate.

In step 810, the AI system collects and buffers a number of uplink (UL) SRS measurements derived from UL SRS transmissions of the mobile client device, the number exceeding a threshold. Assume the first SRS transmission occurs at time $t=t_0$ and assume M separate uplink SRS measurements are performed, each measurement separated by the SRS transmission interval P.

In step 820, the AI system processes SRS signals using Zadoff-Chu (ZC) sequence per UE.

In step 830, the AI system derives Channel Impulse Responses (CIRs) on a per transmit and receive antenna pair basis, from one UL SRS measurement or by combining UL SRS measurements. The AI system also buffers a certain number of CIRs, in a sliding window, wherein each estimated CIR is formed at different SRS reception times. In one embodiment, the AI system extracts L strongest channel coefficient from the CIR for each mobile client device.

In step 840, for each tap, the AI system extracts autocorrelation functions at different lags. The AI system designates the estimate of the time varying channel gain of tap l at time $t=t_0+mP$ as $\{h_l[m], 0<=l<=L-1\}$. Assuming wide-sense stationarity, the normalized tap gain autocorrelation function $R_l[n]$ denotes the correlation of the $l^{th}$ tap at two different times separated by a lag equaling nP and computed as:

$$R_l[n] = \frac{E\{h_l^*[m]h_l[m+n]\}}{E\{|h_l[m]|^2\}}, 0 \le n \le M-1 \quad (3)$$

The numerator and denominator can be empirically computed via $$E\{h_l^*[m]h_l[m+n]\} \approx \frac{1}{M-n}\sum_{m=0}^{M-n-1} h_l^*[m]h_l[m+n] \text{ and}$$

$$E\{|h_l[m]|^2\} \approx \frac{1}{M}\sum_{m=0}^{M-1} |h_l[m]|^2.$$

In step 850, the AI system calculates an average autocorrelation across L'<=L taps. The empirical autocorrelation estimate after averaging across different taps is designated as $$\hat{R}[n] = \frac{1}{L}\sum_l R_l[n], 0 \le n \le M-1.$$

In step 860, the AI system performs fast Fourier transform (FFT) to get a Doppler PSD. The Doppler PSD denoted as S(f), $f \in [-\frac{1}{2}P, \frac{1}{2}P]$ equals the Discrete Fourier Transform of $\hat{R}_l[n]$. The power spectral density tends to take a U-shaped profile with the width of the profile approximately equaling $2f_d$.

In step 870, the AI system inputs the Doppler PSD as features to the Neural Network to categorize a speed of mobile client device. the category output by the ML classifier includes at least one of an estimate of either a travel speed or a range of travel speed of the mobile client device, an estimate of either a travel velocity or a range of travel velocity of the mobile client device, an estimate of either a Doppler frequency or a range of Doppler frequency of a dominant Radio Frequency (RF) propagation path, or an estimate of either a Doppler frequency per path or a range of Doppler frequency per path on a set of RF propagation paths.

The maximum UE speed up to which the PSD method can be used for classification is determined as a function of the SRS transmission interval $P_{ms}$ (in milli-seconds) and the uplink carrier frequency $f_{c,GHz}$ and mathematically given as:

$$MaxSpeed_{kmph} = \frac{540}{P_{ms} \times f_{c,GHz}} \quad (4)$$

Thus, for 5 ms sounding interval at 2.1 GHz carrier, the maximum UE speed up to which the classifier works equals approximately 51.4 Kmph. UE speeds beyond 51.4 Kmph are aliased when the Doppler PSD is computed and could be erroneously classified as a low speed UE.

Figure 9:
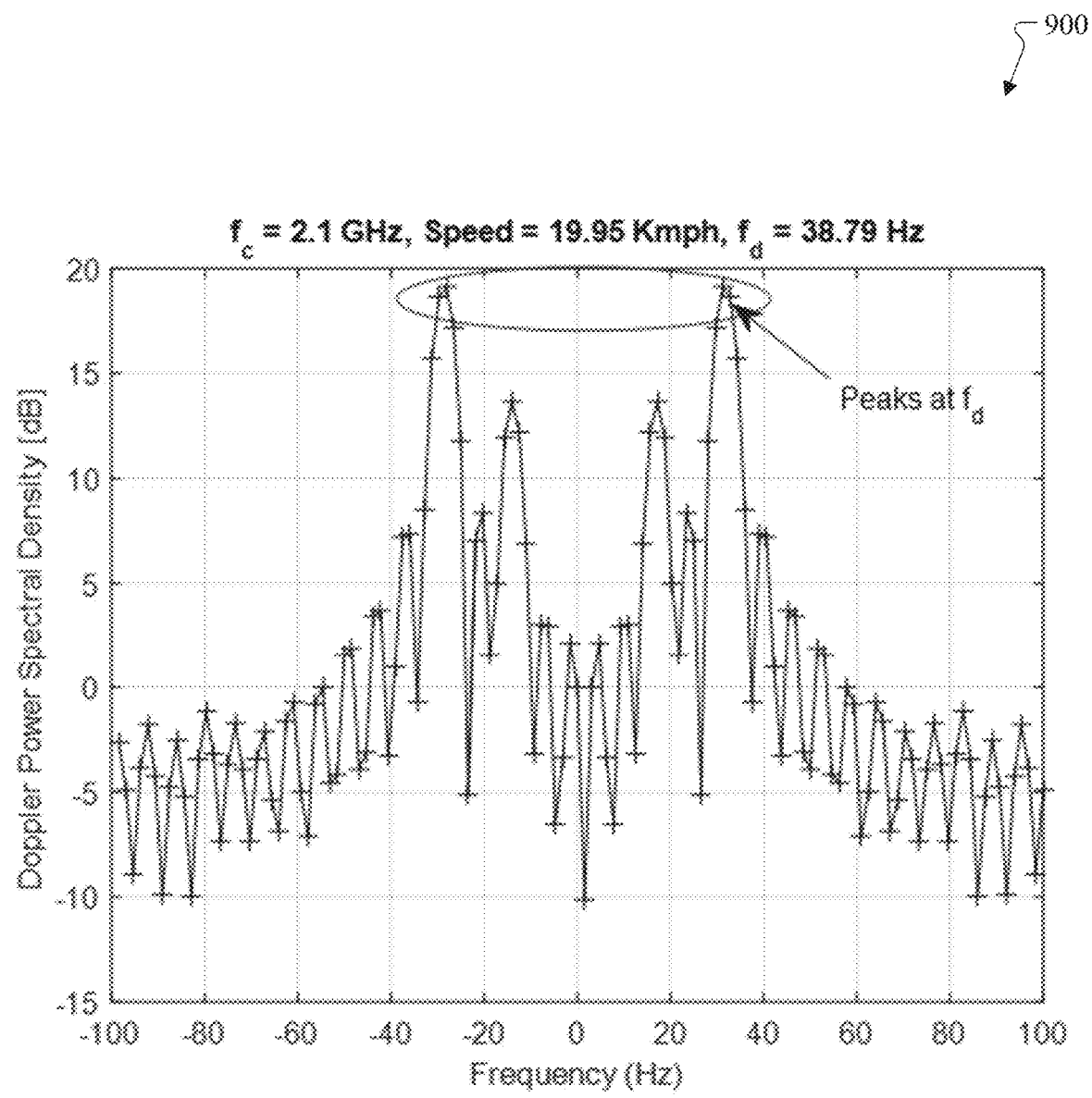
FIG. 9 illustrates an example graph of empirically derived power spectral density (PSD) according to one embodiment of the present disclosure.

FIG. 9 illustrates an example graph 900 of empirically derived power spectral density (PSD) according to one embodiment of the present disclosure. The embodiment shown in FIG. 9 is for illustration only. Other embodiments could be used without departing from the scope of this disclosure.

The Doppler power spectral density at a terminal speed equaling 19.95 Kmph ($f_d$=38.8 Hz) is as shown in FIG. 9. It can be seen that the width of the U-shaped profile approximately equals 77.6 Hz. If the receiver has multiple transmit and receive antennas, then the power spectral density can be separately derived for each TX-RX antenna pair and fed as input features into a 1D/2D convolutional neural network. By training the neural network with labeled power spectral densities, the AI classifier learns to recognize the speed category for that user.

In case of a frequency flat channel (L=1, communication bandwidth W is much less than the reciprocal $f_0$ the delay spread) and assuming with infinite scattering, from the Clarke's model, it can be shown that the normalized autocorrelation $\hat{R}_l[n]$, corresponding to a lag n, reduces to the zeroth order Bessel function of the first order given as $J_0(2n\pi f_d P)$ where $f_d$ is the maximum doppler frequency (as described earlier in document). The power spectral density S(f) reduces to a U-shaped profile given by following equation $$S(f) = \begin{cases} \frac{2W}{f_d\sqrt{1-(fW/f_d)^2}}, & -\frac{f_d}{W} \le f \le \frac{f_d}{W} \\ 0, & \text{else} \end{cases} \quad (5)$$

FIG. 10A illustrates an example of wideband SRS transmissions, and FIG. 10B illustrates an example of frequency hopped SRS (FH SRS) transmissions, according to embodiments of the present disclosure. The embodiments shown in FIGS. 10A and 10B are for illustration only. Other embodiments could be used without departing from the scope of this disclosure.

An additional consideration while deriving the PSD measurements is whether the UE of interest transmits SRS across the entire bandwidth or whether it performs frequency hopped SRS (FH SRS) transmission.

In case of wide-band SRS as illustrated in FIG. 10A, the tap gain autocorrelation function (and hence PSD) can be obtained by correlating the CIRs across consecutive UL SRS measurements. The maximum estimable UE speed is then a function of the maximum SRS transmission interval and is given as expressed in the previous page. During each SRS transmission opportunity, the mobile client device transmits the UL SRSs across an entire bandwidth, the time-domain auto-correlation function is derived by measuring auto-correlation functions at different lags of the buffered CIRs obtained from time-consecutive UL SRS measurements. The channel measurements at a given SRS transmission occasion are derived from corresponding UL SRS measurements.

In case of FH SRS as illustrated in FIG. 10B, since the UE sounds on a different region of spectrum during each hop, the CIR obtained by taking the IDFT over the SRS frequency domain position on a given hop may not accurately represent the true CIR (based on the wideband channel). During each SRS transmission opportunity, the mobile client device transmits SRSs across a portion on an entire bandwidth in a frequency hopping manner. The channel measurements for the entire bandwidth are derived by concatenation of the channel measurements on each bandwidth portion, obtained from UL SRS measurements occurring on consecutive UL SRS hopping transmission occasions. The time-domain auto-correlation function is obtained by correlating the buffered CIRs derived from uplink SRS measurements on time-adjacent SRS transmissions, or the time domain auto-correlation function is obtained by correlating buffered CIRs derived from uplink SRS measurements extracted from UL SRS hopping transmission occasions occurring on identical frequency sub-bands.

Figure 11A:
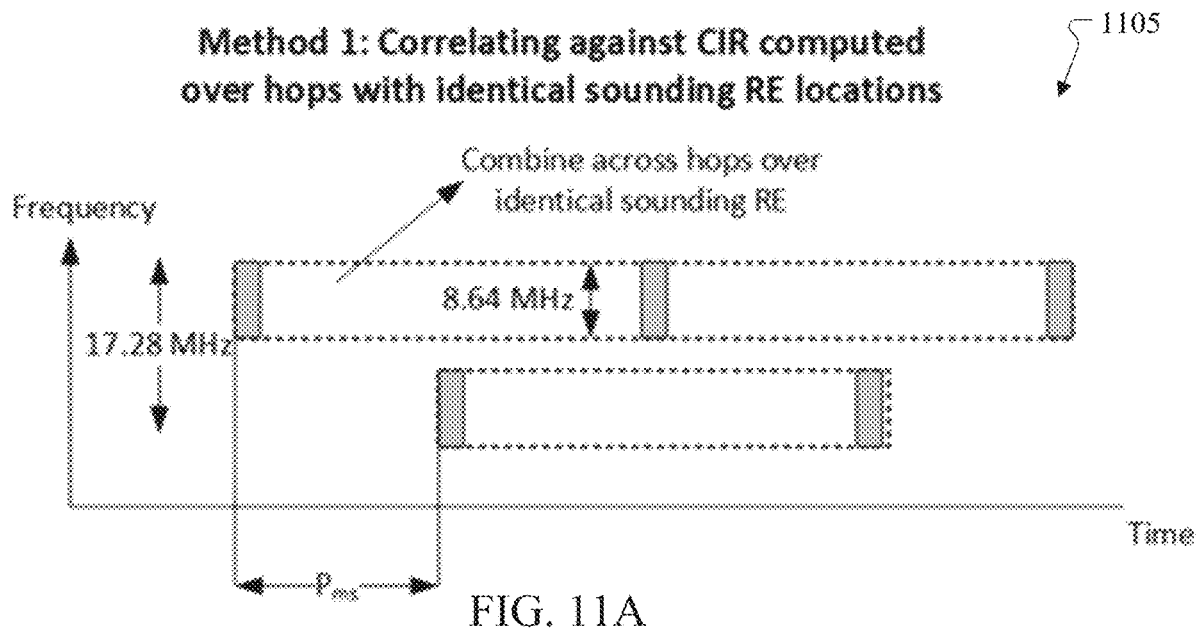
FIGS. 11A and 11B illustrate two methods for correlating across CIRs for the case of FH SRS according to one embodiment of the present disclosure.
Figure 11B:
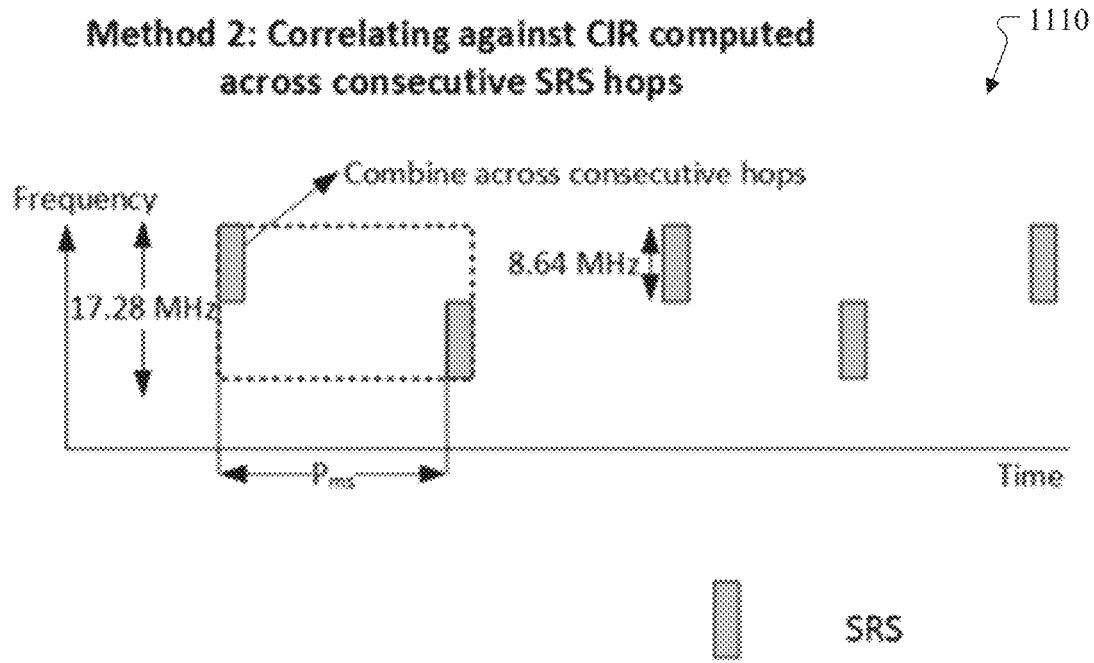

FIGS. 11A and 11B illustrate two methods for correlating across CIRs for the case of FH SRS according to one embodiment of the present disclosure. The embodiments shown in FIGS. 11A and 11B are for illustration only. Other embodiments could be used without departing from the scope of this disclosure.

There are several methods of correlating the CIRs to compute the autocorrelation function. In the first method, the CIRs are correlated by combining SRS hops on per identical sounding resource element, as illustrated in FIG. 11A. While this method accurately captures the channel variation across SRS on identical resources, the maximum estimable UE speed is limited by how often the UE sounds on identical RE positions, and given as $$MaxSpeed_{kmph} = \frac{540}{P_{ms} \times N_{hops} \times f_{c,GHz}} \quad (6)$$

In the second method, the CIRs are correlated by combining adjacent SRS hops even though the hops may correspond to different sounding resource elements, as illustrated in FIG. 11B. This method has the same maximum estimable UE speed as that corresponding to wide-band SRS.

In the third method, when the UE transmits SRS on a sub-band $SB_k$, the delays and complex channel gains are estimated by correlating the frequency domain channel corresponding to $SB_k$. The frequency domain channel on the other sub-bands $SB_l$ (l is different from k) is estimated by reconstructing the channel response from the estimated delays and complex channel gains. After assembling the estimated channel over other sub-bands in addition to the sub-band on which the UE sounds, the entire wide-band SRS measurement is available. Thereafter, the doppler power spectrum is estimated by correlating the IFFT of the reconstructed frequency domain channel across consecutive sounding occasions.

In-Phase and Quadrature (IQ) Channel Feature Extraction

In some embodiments, the raw channel measurement can be used to train the AI classifier. The motivation behind this embodiment is that raw channel measurement will include more information related to UE speed. Training with large amount of raw measurements, the AI classifier can automatically learn the features of channel measurements and store these learned features into the weight parameters of the neural network. The raw channel measurements in this embodiment could be measurements on several dimensions, e.g., time dimensional channel snapshots (SRS) with a periodicity of P ms, channel samples on OFDM subcarriers, spatial dimensional channel samples on different antennas, real part of channel and imaginary part of the channel.

There are several methods to design which part of raw channel measurement will be input to the AI classifier.

In one embodiment, the extracted features are outputs of a linear or non-linear function of real and imaginary portions of channel measurements derived from UL SRS measurements per transmit and receive antenna pair during each UL SRS transmission occasion, wherein the linear or non-linear function comprises a pre-processing process of applying a fusion function of the real and imaginary portions of the channel measurements, wherein the fusion function is configured to output the real and imaginary portions of the channel measurements in a frequency domain, or a convex combination of weighted real portions and imaginary portions of the channel measurements in one of the frequency domain, a receive (RX) antenna domain, a transmit (TX) antenna domain, a subcarrier domain, or a channel snapshot domain.

In this embodiment, both real and imaginary part of frequency domain channel measurements will be input to the AI classifier. Denote the channel as H which is a 4 dimensional $N_{rx} \times N_{tx} \times N_{sub} \times M$ complex tensor, where $N_{rx}$ denotes the number of transmit antennas, $N_{tx}$ denotes the number of receive antennas, $N_{sub}$ denotes the number of subcarriers used by SRS, M denotes the number of channel snapshots.

The input to the AI classifier will be the concatenated tensor where real part of the channel measurement and imaginary part of the channel measurement will be concatenated in one dimension. For example, the input to AI classifier is of the dimension of $(2N_{rx}) \times N_{tx} \times N_{sub} \times M$ tensor where real and imaginary part of channel measurements are concatenated in RX antenna dimension, or it can be $N_{rx} \times (2N_{tx}) \times N_{sub} \times M$ tensor where real and imaginary part of channel measurements are concatenated in tx antenna domain, or it can be $N_{rx} \times N_{tx} \times (2N_{sub}) \times M$ tensor where real and imaginary part of channel measurements are concatenated in subcarrier domain, or it can be $N_{rx} \times N_{tx} \times N_{sub} \times (2M)$ tensor where real and imaginary parts of channel measurements are concatenated in channel snapshot domain.

Figure 11C:
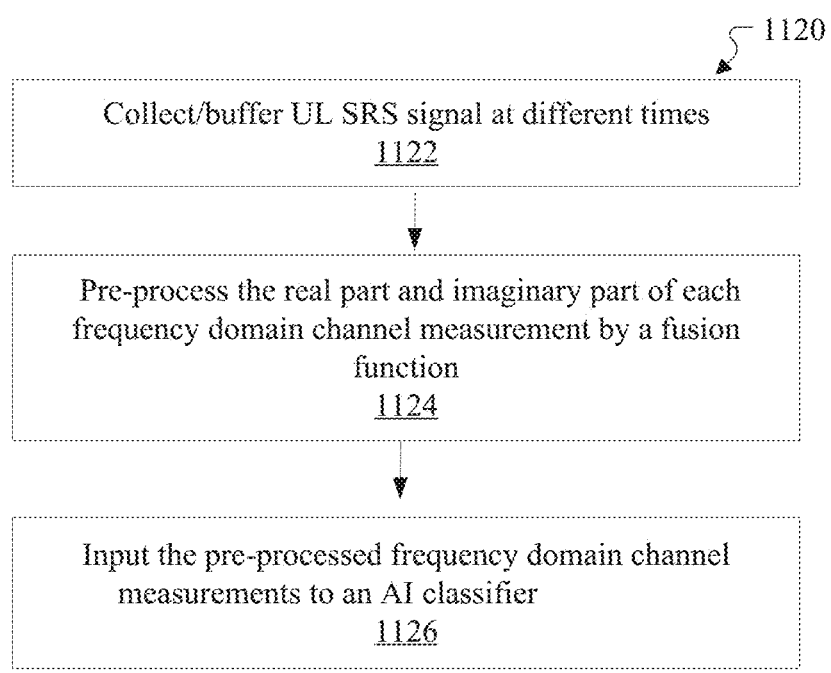
FIG. 11C illustrates an exemplary flowchart for pre-processing frequency domain channel measurements for a deep neural network architecture according to embodiments of the present disclosure.

FIG. 11C illustrates an exemplary flowchart 1120 for pre-processing frequency domain channel measurements for a deep neural network architecture according to embodiments of the present disclosure. The embodiment shown in FIG. 11C is for illustration only. Other embodiments of the flowchart 1120 could be used without departing from the scope of this disclosure.

The base station buffers a number of uplink (UL) SRS frequency domain measurements derived from different UL SRS transmissions of the mobile client device in step 1122.

The real part and imaginary part of each frequency domain channel measurement will be first pre-processed by a general fusion function $f_{ri}$ in step 1124, and then input to an AI classifier with input dimension of $N_{rx} \times N_{tx} \times N_{sub} \times M$, in step 1126. For example, one fusion function can be the inverse tangent function to get the phase of the channel measurement. Another fusion function can be $$f_{ri} = w_0 H^{Re} + (1-w_0) H^{Im} \quad (7)$$

where $w_0 \in [0,1]$. Specifically, if $w_0 = 0$, then only imaginary part of channel measurements will be input to AI classifier; if $w_0 = 1$, then only real part of channel measurements will be input to AI classifier. $H^{Re}$ and $H^{Im}$ respectively indicate each real portion and each imaginary portion of the channel measurements in the frequency domain.

In yet another embodiment, a fusion function is applied to either the RX antenna domain, or applied to TX antenna domain, or to subcarrier domain, or in channel snapshot domain, or a combination of these domains. A fusion function across different domains will further reduce the complexity of the AI classifier. In one example of this method, a fusion function is applied to the RX antenna domain. Denote $H_0^{Rx}, H_1^{Rx}, H_2^{Rx}, \ldots, H_{Nrx}^{Rx}$ as the channel measurements on each Rx antenna, the fusion function $f_{Rx}$ can be expressed as $$f_{Rx} = w_0 \times H_0^{Rx} + w_1 \times H_1^{Rx} + w_2 \times H_2^{Rx} + \ldots + w_{Nrx} \times H_{Nrx}^{Rx}, \quad (8)$$

where $w_0 + w_1 + \ldots + w_{Nrx} = 1$, $w_0, w_1, \ldots, w_{Nrx} \in [0,1]$.

In yet another method of this embodiment, both real and imaginary parts of time domain raw channel measurement will be input to the AI classifier. Denote the channel as H which is a 4 dimensional $N_{rx} \times N_{tx} \times N_{taps} \times M$ complex tensor, where $N_{taps}$ denotes the number of taps of the estimated CIR. The same concatenating method, fusion method can be used as mentioned in the above embodiments. In general, any function f( ) may be defined which can operate over the channel measurements and then the resulting output may be input to the neural network. The type of the neural network chosen can be a simple feed forward NN, or a recurrent neural network or any advanced neural network and can be adapted for the need.

Figure 12:
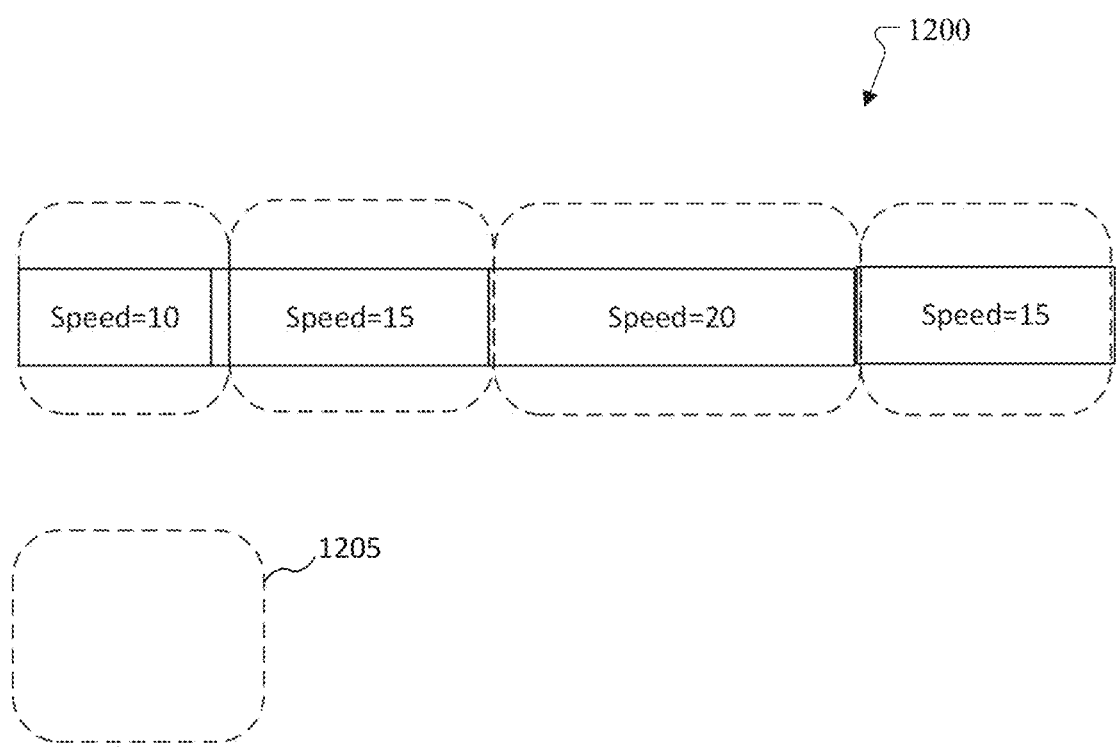
FIG. 12 illustrates an example of a sliding-window based mechanism to track a UE speed according to one embodiment of the present disclosure.

FIG. 12 illustrates an example of a sliding-window based mechanism to track a UE speed according to one embodiment of the present disclosure.

The AI system can use a sliding-window 1205 based mechanism to track and identify a UE speed or changes to a UE speed class. The AI system buffers a certain number of CIRs, in a sliding window, wherein each estimated CIR is formed at different SRS reception times, wherein a size of the sliding window is adjustable based on the categories to the speed of a mobile client device belongs to.

Since the exact time when the UE changes its speed is unknown to the gNB (base station) or to any other terminal (considering the other end terminal with which a link is established is moving). The appropriate window size can need to be figured out in order to obtain the testing data. The size of the window and the moving rate of the window can be chosen appropriately considering the confidence required. In one embodiment, the window size can be proportional to the confidence required.

The output layer of the classifier provides a probability estimate of the individual class membership probabilities of the terminal speed based on the UL SRS measurements. For example, with M class categories (e.g. for M=2, the categories for the labeled data during training stage could be Speed<=25 Kmph and 25<=Speed<=51 Kmph), the neural classifier will return as output a vector of M outputs summing to one. In one embodiment, the speed category for the user is determined by the class corresponding to the index of the maximum within the vector. To realize the outputs of the neural classifier o be a valid probability distribution, the output layer can have a "softmax" activation function. Other embodiments for activation functions at the output layer of the neural network are also possible as long as the activation function returns a vector of M outputs summing to one.

Figure 13A:
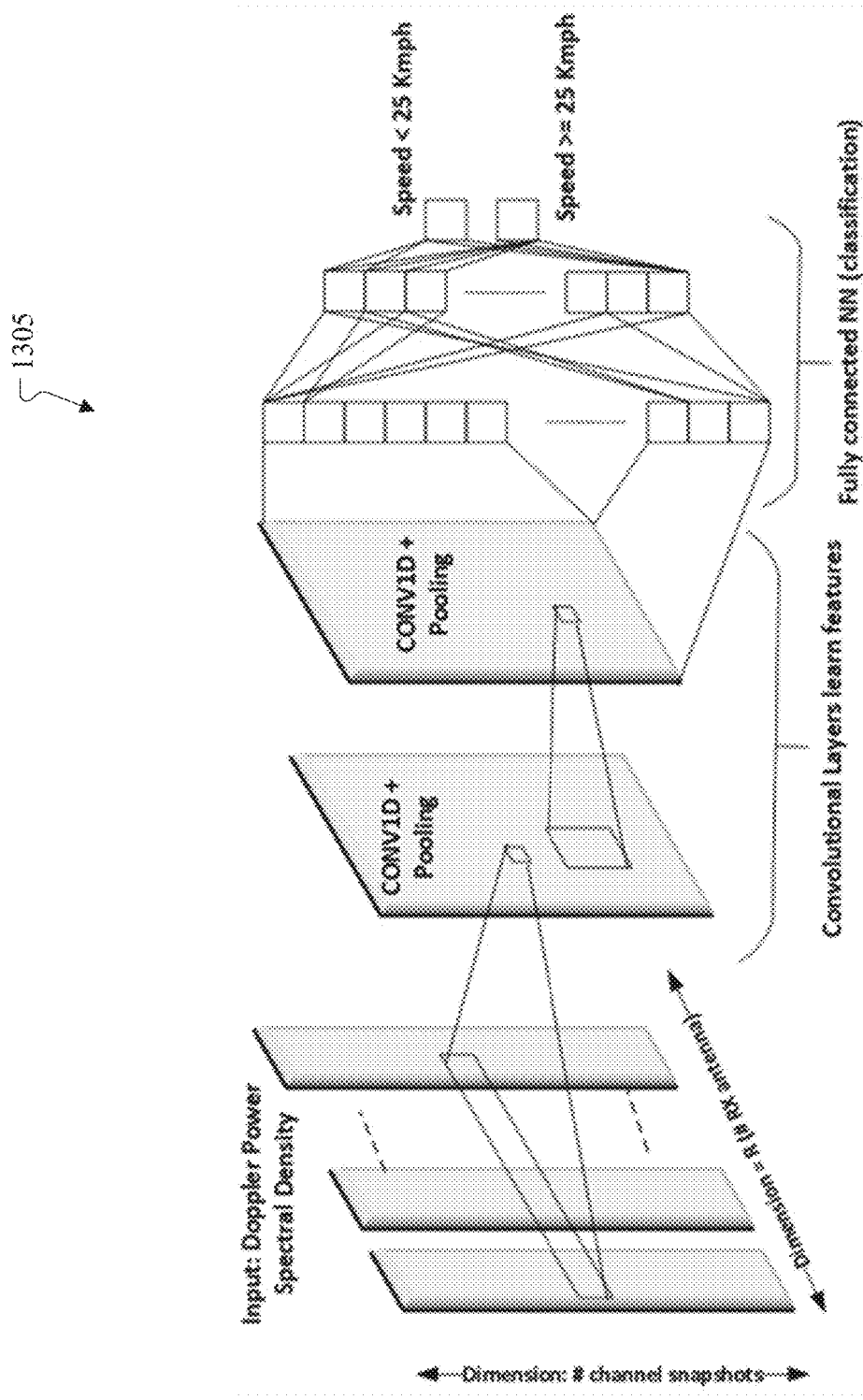
FIG. 13A illustrates an example of a convolutional neural network (CNN) classifier for estimating a UE speed based on Doppler power spectrum measurements.
Figure 13B:
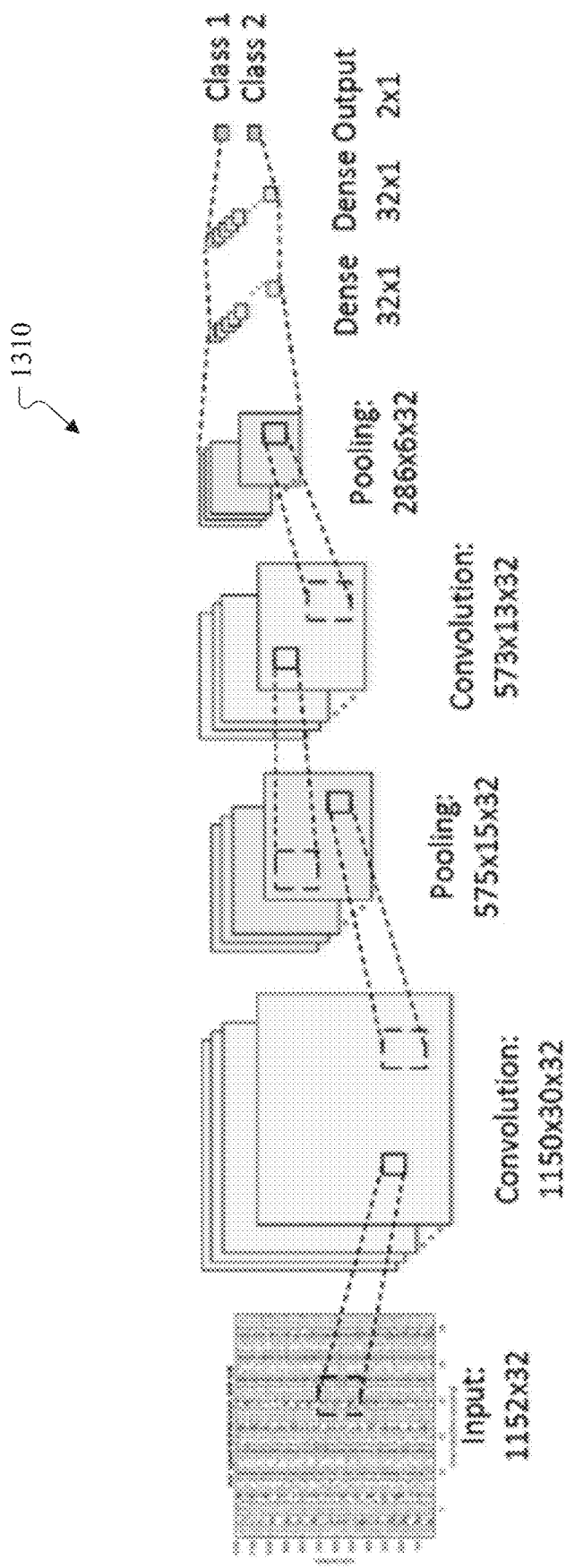
FIG. 13B illustrates an example of a CNN speed classifier based on raw frequency domain UL SRS measurements, according to embodiments of the present disclosure.

FIG. 13A illustrates an example of a convolutional neural network (CNN) classifier for estimating a UE speed based on Doppler power spectrum measurements, and FIG. 13B illustrates an example of a CNN speed classifier based on raw frequency domain UL SRS measurements, according to embodiments of the present disclosure. The embodiment shown in FIGS. 13A and 13B are for illustration only. Other embodiments of the flowchart 700 could be used without departing from the scope of this disclosure.

The deep neural networks as illustrated in FIGS. 13A and 13B include multiple convolutional neural network (CNN) layers, multiple fully connected (FC) neural network layers, and multiple recurrent neural network layers.

The convolutional neural network architecture 1305 as shown in FIG. 13A estimates a UE speed based on a set of power spectrum density measurements. The convolutional neural network architecture 1305 comprises two one-dimension (1D) convolutional layers followed by a fully connected neural network architecture. Pooling layers are present between the output of each convolutional layer and the next layer in order to reduce the dimension of the output.

The deep neural network architecture 1310 as shown in FIG. 13B estimates a UE speed based on a set of preprocessed frequency domain real and imaginary portions of UL SRS measurements. The deep neural network architecture 1310 includes a pooling layer placed between a CNN layer and a subsequent CNN layer, a flattening layer placed between a final CNN layer and a first FC layer, and a last FC layer producing an activation output determined using a softmax output activation wherein a dimension of the activation output equals a number of candidate categories. The deep neural network architecture returns an output that is determined by an index for an argument maximizer of the activation output of the last fully connected layer, and that specifies an estimated category of the mobility of the mobile client device.

Figure 13C:
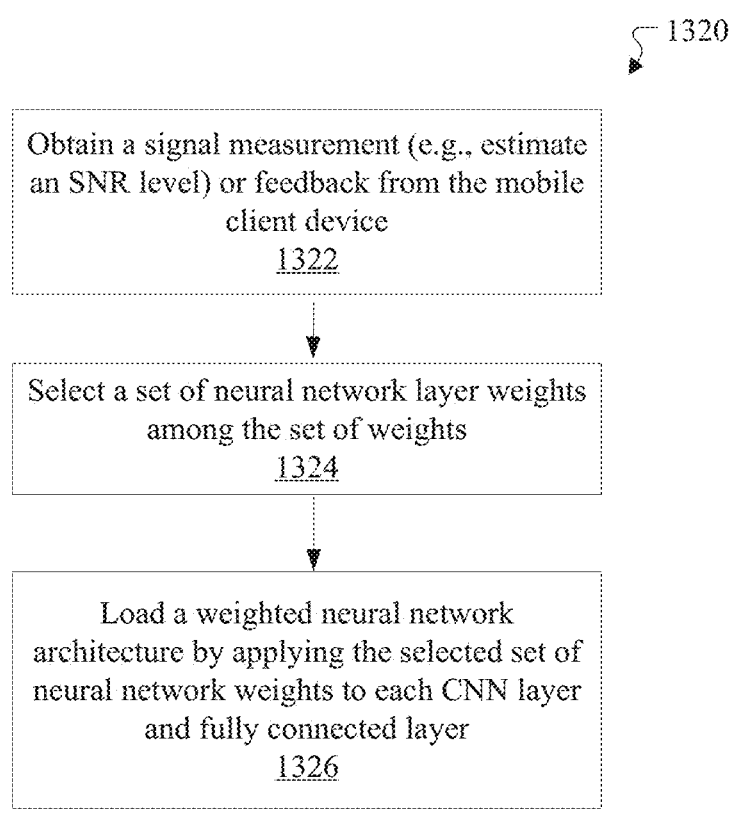
FIG. 13C illustrates an exemplary flowchart 1320 for a deep neural network architecture with different sets of neural network layer weights to be applied to each layer of the multiple CNN layers, according to embodiments of the present disclosure.

FIG. 13C illustrates an exemplary flowchart 1320 for a deep neural network architecture with different sets of neural network layer weights to be applied to each layer of the multiple CNN layers, according to embodiments of the present disclosure. The embodiment shown in FIG. 13C is for illustration only. Other embodiments of the flowchart 1320 could be used without departing from the scope of this disclosure.

The deep neural network architectures 1305, 1310 can include a number of layers and connectivities between each layer and its subsequent layer for the deep neural network architecture, and different sets of neural network layer weights to be applied to each layer of the multiple CNN layers.

In step 1322, the deep neural network architecture obtains a signal measurement (e.g., estimate an SNR level) or feedback from the mobile client device.

In step 1324, the deep neural network architecture selects one set of neural network layer weights, among different sets of neural network layer weights, based on a certain signal measurement or feedback from the mobile client device, and apply the selected set of neural network layer weights to each layer of the multiple CNN layers.

In step 1326, the deep neural network architecture loads a weighted neural network architecture by applying the selected set of neural network weights to each CNN layer and fully connected layer.

Each different set of neural network weights corresponds to different estimated signal to noise ratio (SNR) levels. The deep neural network architectures 1305, 1310 estimate an SNR level based on a reference signal received power (RSRP) and a reference signal received quality (RSRQ) reported, or based on channel quality indication (CQI) feedback from the mobile client device, selects a set of neural network layer weights among the set of weights, based on the estimated different SNR level, and loads a weighted neural network architecture for determining the category to be used to estimate mobility of the mobile client device, by applying the selected set of neural network weights to each CNN layer and fully connected layer.

In some embodiment of this disclosure, the deep neural network architectures 1305, 1310 can adapt to the change of SNR levels. During the training stage, the deep neural network architectures 1305, 1310 can be trained with channel measurements at different SNR levels and stores the neural network weights at each SNR level. During the online testing stage, with different SNR level, deep neural network architectures 1305, 1310 load different weights to do UE speed estimation/classification. The SNR level can be obtained from RSRP and RSRQ reported from UE. The following is the procedures for UE speed estimation considering different SNR levels: 1) Estimate the SNR level for a UE based on the RSRP and RSRQ information; 2) based on different SNR level, load different neural network weights; 3) obtain the channel measurements and input measurement or pre-processed measurement to the neural network architectures; and 4) get the UE speed estimation/classes.

In some embodiment of this disclosure, the output layer of the neural network can be modified to a rectified linear unit (ReLU) function. During the supervised learning stage, the true UE speed will be feed to the neural network. After training, the neural network will have the capability to predict the UE speed based on the channel measurements.

Classifier accuracy has been shown 2 class classifications, although the method can be straight-forwardly extended to more than 2 classes. In the evaluations, it is assumed that the SRS is transmitted once every $P_{ms}$=5 ms and the carrier frequency on uplink equals $f_{c,GHz}$=2.1 GHz.

Table 1 shows classifier accuracies for wideband SRS in a no line-of-sight channel. In Table 1, the classification accuracy is shown for the case of wide-band SRS transmission assuming a 5 ms SRS transmission interval, non-line of sight (NLOS) channel (resp. line of sight (LOS) channel) and carrier frequency equaling 2.1 GHz. The speed thresholds for the two classes are Speed<25 Kmph (Class 1) and 25 Kmph<Speed<51 Kmph (Class 2).

At SNR=6 dB, under NLOS channel, the neural classifiers provide nearly 90% classification accuracy. It can be seen that even when the SNR equals 0 dB, the accuracies achieved by the neural classifiers are at least 85% for the Non Line of Sight scenario. The performance of the neural classifiers under LOS conditions is worse because the dominant LOS path implies that the classifier has more difficulty learning the magnitude of the velocity vector. Nevertheless, the performance of the classifiers is uniformly over 75%.

TABLE 1

| Channel Parameters | Scheme | Accuracy |
|---|---|---|
| SNR = 6 dB | (Non AI baseline) PSD | 74% |
| | Neural PSD | 88% |
| | Raw channel (96 RB) | 94% |
| | Raw channel (6RB) | 94% |
| SN = 0 dB | (Non AI baseline) PSD | 74% |
| | Neural PSD | 85% |
| | Raw channel (96 RB) | 94% |
| | Raw channel (6RB) | 92.5% |

TABLE 2

Classification accuracy for Wide Band SRS in Line of Sight Channel

| Channel Parameters | Scheme | Accuracy |
|---|---|---|
| LOS, SNR = 6 dB | (Non AI baseline) PSD | — |
| | Neural PSD | 76-78% |
| | Raw channel (96 RB) | 80.5% |
| | Raw channel (6RB) | 83% |
| LOS, SNR = 0 dB | (Non AI baseline) PSD | 70% |
| | Neural PSD | 73% |
| | Raw channel (96 RB) | 78% |
| | Raw channel (6RB) | 78% |

Table 2 analyzes the classification accuracy with the neural classifiers with lower SRS transmission periodicities. It is seen that good classifier accuracy is achieved as long as the sounding interval is 10 ms or lower.

Table 3 shows the impacts of a lower SRS transmission periodicity on the classifier accuracy.

TABLE 3

| | | Feature | Classifier Accuracy |
|---|---|---|---|
| $P_{ms}$ = 10 ms | LOS | PSD | 76% |
| | | Raw Channel | 82% |
| SNR = 6 dB | NLOS | PSD | 86% |
| | | Raw Channel | 95% |
| $P_{ms}$ = 20 ms | LOS | PSD | 58% |
| | | Raw Channel | 52% |

TABLE 3-continued

| | | Feature | Classifier Accuracy |
|---|---|---|---|
| SNR = 6 dB | NLOS | PSD | 69% |
| | | Raw Channel | 81% |
| $P_{ms}$ = 40 ms | LOS | PSD | TBD |
| | | Raw Channel | 54% |
| SNR = 6 dB | NLOS | PSD | TBD |
| | | Raw Channel | 59% |

Table 4 below shows classification accuracies for FH SRS by correlating across SRS hops with identical sounding RE positions.

TABLE 4

| System Parameters | Speed Classes | Channel Model | Classifier Accuracy |
|---|---|---|---|
| $N_{hop}$ = 2 hops, $P_{ms}$ = 5 ms, SNR = 6 dB | Class 1: Speed <= 12.8 Kmph | 3GPP TR 38.901 NLOS model | 77% |
| | Class 2: 12.8 Kmph < Speed < 25.6 Kmph | 3GPP TR 38.901 LOS model | 90% |

Table 5 below shows classification accuracies for FH SRS by correlating across adjacent SRS hops.

TABLE 5

| System Parameters | Speed Classes | Channel Model | Classifier Accuracy |
|---|---|---|---|
| N = 2 hops, $P_{ms}$ = 5 ms, SNR = 6 dB | Class 1 : Speed <= 25 Kmph | 3GPP TR 38.901 NLOS model | 94% |
| | Class 2: 25 Kmph < Speed < 51 Kmph | 3GPP TR 38.901 LOS model | 80% |
| $N_{hop}$ = 4 hops, $P_{ms}$ = 5 ms, SNR = 6 dB | | 3GPP TR 38.901 NLOS model | 80% |
| | | 3GPP TR 38.901 LOS model | 76% |

From Table 4 and Table 5, it can be seen that the classification accuracy when the UE transmits FH SRS is quite competitive against the case when the UE transmits SRS in a wide-band manner.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for performing a wireless communication, the apparatus comprising:
   a communication interface configured to receive uplink (UL) Sounding Reference Signals (SRSs) from a mobile client device; and
   at least one processor configured to:
      buffer UL SRS measurements derived from the UL SRSs received from the mobile client device, a number of the UL SRS measurements exceeding a threshold;
      extract features from the UL SRS measurements;
      obtain a machine learning (ML) classifier for determining a category to be used for estimating mobility associated with the mobile client device, wherein the ML classifier is a deep neural network including at least one of multiple Convolutional Neural Network (CNN) layers; multiple Fully Connected (FC) Neural Network layers; or multiple Recurrent Neural Network layers; and
      determine the category of the mobile client device by applying the extracted features to the ML classifier.

2. The apparatus of claim 1, where the category determined using the ML classifier includes at least one of:
   an estimate of either a travel speed, or a range of travel speed of the mobile client device;
   an estimate of either a travel velocity or a range of travel velocity of the mobile client device;
   an estimate of either a Doppler frequency or a range of Doppler frequency of a dominant Radio Frequency (RF) propagation path; or
   an estimate of either a Doppler frequency per path or a range of Doppler frequency per path on a set of RF propagation paths.

3. The apparatus of claim 1, wherein if the extracted features are either a set of power spectrum density measurements or a set of pre-processed frequency domain real and imaginary portions of UL SRS measurements, the ML classifier utilizes a deep neural network architecture comprising multiple dimensional CNN and multiple FC layers, the deep neural network architecture comprising:
   a pooling layer placed between a CNN layer and a subsequent CNN layer;
   a flattening layer placed between a final CNN layer and a first FC layer; and
   a last FC layer producing an activation output determined using a softmax output activation wherein a dimension of the activation output equals a number of candidate categories,
   wherein the deep neural network architecture returns an output that is determined by an index for an argument maximizer of the activation output of a last fully connected layer, and that specifies an estimated category of the mobility of the mobile client device.

4. The apparatus of claim 3, wherein the apparatus further comprises:
   a memory configured to store:
      a deep neural network architecture including a number of layers and connectivities between each layer and its subsequent layer for the deep neural network architecture; and
      different sets of neural network layer weights to be applied to each layer of the multiple CNN layers, and
   wherein the at least one processor is configured to load a set of neural network layer weights based on a certain signal measurement or feedback from the mobile client device.

5. An apparatus for performing a wireless communication, the apparatus comprising:
a communication interface configured to receive uplink (UL) Sounding Reference Signals (SRSs) from a mobile client device; and
at least one processor configured to:
buffer UL SRS measurements derived from the UL SRSs received from the mobile client device, a number of the UL SRS measurements exceeding a threshold;
extract features from the UL SRS measurements;
obtain a machine learning (ML) classifier for determining a category to be used for estimating mobility associated with the mobile client device; and
determine the category of the mobile client device by applying the extracted features to the ML classifier,
wherein the extracted features include a set of frequency domain Doppler Power Spectral Density measurements that are estimated by:
deriving Channel Impulse Responses (CIRs) on a per transmit and receive antenna pair basis, from one UL SRS measurement or by combining UL SRS measurements;
buffering a certain number of CIRs, in a sliding window, wherein each estimated CIR is formed at different SRS reception times;
deriving a time-domain auto-correlation function obtained by correlating the buffered CIRs at different SRS reception times; and
taking a Fast Fourier Transform of the time-domain auto-correlation function,
wherein a size of the sliding window is adjustable based on the category to which the mobile client device belongs.

6. The apparatus of claim 5, wherein if, during each SRS transmission opportunity, the mobile client device transmits the UL SRSs across an entire bandwidth, the time-domain auto-correlation function is derived by measuring auto-correlation functions at different lags of the buffered CIRs obtained from time-consecutive UL SRS measurements.

7. The apparatus of claim 5, wherein if, during each SRS transmission opportunity, the mobile client device transmits SRSs across a portion on an entire bandwidth in a frequency hopping manner:
the time-domain auto-correlation function is obtained by correlating the buffered CIRs derived from uplink SRS measurements on time-adjacent SRS transmissions; or
the time domain auto-correlation function is obtained by correlating buffered CIRs derived from uplink SRS measurements extracted from UL SRS hopping transmission occasions occurring on identical frequency sub-bands.

8. The apparatus of claim 1, wherein:
the extracted features are outputs of a linear or non-linear function of real and imaginary portions of channel measurements derived from UL SRS measurements per transmit and receive antenna pair during each UL SRS transmission occasion,
the linear or non-linear function comprises a pre-processing process of applying a fusion function of the real and imaginary portions of the channel measurements, and
the fusion function is configured to output:
the real and imaginary portions of the channel measurements in a frequency domain; or
a convex combination of weighted real portions and imaginary portions of the channel measurements in one of the frequency domain, a receive (RX) antenna domain, a transmit (TX) antenna domain, a subcarrier domain, or a channel snapshot domain.

9. The apparatus of claim 8, wherein the fusion function is at least one of:
an inverse tangent function to obtain phases of the real and imaginary portions of the channel measurements;
a weighted combination function, $w*H_{re}+(1-w)*H_{im}$, where w takes values between 0 and 1, and $H_{re}$ and $H_{im}$ respectively indicate each real portion and each imaginary portion of the channel measurements in the frequency domain; or
a weighted combination function, $w_1 H_{rx1}+w_2 H_{rx2}+\ldots+w_{rxN} H_{rxN}$, where weights $w_{rxi}$, $1<=i<=N$, are each non-negative, all $w_{rxi}$ summing to 1, and $H_{rxi}$ denotes a channel measurement at receive antenna i.

10. The apparatus of claim 9, wherein real portions and imaginary portions of channel measurements are concatenated in one of four dimensions to produce a four (4) dimensional complex tensor including one of:
$(2N_{rx})\times N_{tx}\times N_{sub}\times M$, where real and imaginary portions of channel measurements are concatenated in a receive (RX) antenna domain;
$N_{rx}\times(2N_{tx})\times N_{sub}\times M$, where real and imaginary portions of channel measurements are concatenated in a transmit (TX) antenna domain;
$N_{rx}\times N_{tx}\times(2N_{sub})\times M$, where real and imaginary portions of channel measurements are concatenated in the subcarrier domain; or
$N_{rx}\times N_{tx}\times N_{sub}\times(2M)$, where real and imaginary portions of channel measurements are concatenated in the channel snapshot domain,
where $N_{tx}$ denotes a quantity of TX antennas, $N_{rx}$ denotes a quantity of RX antennas, $N_{sub}$ denotes a quantity of subcarriers used by the UL SRSs, and M denotes a quantity of channel snapshots.

11. The apparatus of claim 1, wherein if, during each SRS transmission opportunity, the mobile client device transmits the UL SRS across an entire bandwidth, channel measurements at a given SRS transmission occasion are derived from corresponding UL SRS measurements.

12. The apparatus of claim 1, wherein if, during each SRS transmission opportunity, the mobile client device transmits the UL SRS across a portion of an entire bandwidth in a frequency hopping manner, channel measurements for the entire bandwidth are derived by concatenation of the channel measurements obtained from UL SRS measurements occurring on consecutive UL SRS hopping transmission occasions.

13. The apparatus of claim 12, wherein:
each different set of neural network weights corresponds to different estimated signal to noise ratio (SNR) levels, and
the processor is configured to:
estimate an SNR level based on a reference signal received power (RSRP) and a reference signal received quality (RSRQ) reported, or based on channel quality indication (CQI) feedback from the mobile client device;
select a set of neural network layer weights among the set of weights, based on the estimated different SNR level; and
load a weighted neural network architecture for determining the category to be used to estimate mobility of the mobile client device, by applying the selected set of neural network weights to each CNN layer and fully connected layer.

14. A method for estimating a speed of a mobile client device, the method comprising:
measuring uplink (UL) Sounding Reference Signals (SRSs) received from a mobile client device;
buffering UL SRS measurements derived from the UL SRS received from the mobile client device, a number of the UL SRS measurements exceeding a threshold;
extracting features from the UL SRS measurements;
obtaining a machine learning (ML) classifier for determining a category to be used for estimating mobility associated with the mobile client device, wherein the ML classifier is a deep neural network including at least one of multiple Convolutional Neural Network (CNN) layers;
multiple Fully Connected (FC) Neural Network layers; or multiple Recurrent Neural Network layers; and
determining the category of the mobile client device by applying the extracted features to the ML classifier.

15. The method of claim 14, further comprising:
extracting a set of frequency domain Doppler Power Spectral Density measurements that are estimated by:
deriving Channel Impulse Responses (CIRs) on a per transmit and receive antenna pair basis, from one UL SRS measurement or by combining UL SRS measurements;
buffering a certain number of CIRs, in a sliding window, wherein each estimated CIR is formed at different SRS reception times;
deriving a time-domain auto-correlation function obtained by correlating the buffered CIRs at different SRS reception times; and
taking a Fast Fourier Transform of the time-domain auto-correlation function,
wherein a size of the sliding window is adjustable based on the category to the mobile client device belongs to.

16. The method of claim 15, wherein based on, during each SRS transmission opportunity, the mobile client device transmitting the UL SRSs across an entire bandwidth, a time-domain auto-correlation function is derived by measuring auto-correlation functions at different lags of the buffered CIRs obtained from time-consecutive UL SRS measurements.

17. The method of claim 15, wherein based on, during each SRS transmission opportunity, the mobile client device transmitting SRSs across a portion on an entire bandwidth in a frequency hopping manner:
a time-domain auto-correlation function is obtained by correlating the buffered CIRs derived from uplink SRS measurements on time-adjacent SRS transmissions; or
the time domain auto-correlation function is obtained by correlating buffered CIRs derived from uplink SRS measurements extracted from UL SRS hopping transmission occasions occurring on identical frequency sub-bands.

18. The method of claim 14, wherein:
the extracted features are outputs of a linear or non-linear function of real and imaginary portions of channel measurements derived from UL SRS measurements per transmit and receive antenna pair during each UL SRS transmission occasion,
the linear or non-linear function comprises a pre-processing process of applying a fusion function of the real and imaginary portions of the channel measurements, and
the fusion function is configured to output:
the real and imaginary portions of the channel measurements in a frequency domain; or
a convex combination of weighted real portions and imaginary portions of the channel measurements in one of the frequency domain, a receive (RX) antenna domain, a transmit (TX) antenna domain, a subcarrier domain, or a channel snapshot domain.

19. The method of claim 14, further comprising
estimating a signal-to-noise ratio (SNR) level based on a reference signal received power (RSRP) and a reference signal received quality (RSRQ) reported, or based on channel quality indication (CQI) feedback from the mobile client device;
selecting a set of neural network layer weights among the set of weights, based on estimated different SNR levels; and
loading a weighted neural network architecture for determining the category to be used to estimate mobility of the mobile client device, by applying the selected set of neural network weights to each CNN layer and fully connected layer.

20. The apparatus of claim 5, wherein the ML classifier is a deep neural network including at least one of:
multiple Convolutional Neural Network (CNN) layers;
multiple Fully Connected (FC) Neural Network layers; or
multiple Recurrent Neural Network layers.

* * * * *